(12) United States Patent
Kubo et al.

(10) Patent No.: US 6,996,196 B2
(45) Date of Patent: Feb. 7, 2006

(54) SEQUENCE ESTIMATION METHOD AND SEQUENCE ESTIMATOR

(75) Inventors: Hiroshi Kubo, Tokyo (JP); Kazuo Tanada, Tokyo (JP); Keishi Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 342 days.

(21) Appl. No.: 10/315,131

(22) Filed: Dec. 10, 2002

(65) Prior Publication Data

US 2003/0081702 A1 May 1, 2003

Related U.S. Application Data

(63) Continuation of application No. 09/083,507, filed on May 22, 1998, now Pat. No. 6,556,632.

(30) Foreign Application Priority Data

| Jul. 23, 1997 | (JP) | ................................ 9-197092 |
| Feb. 4, 1998 | (JP) | ................................ 10-022901 |

(51) Int. Cl.
*H04L 27/06* (2006.01)
*H03M 13/03* (2006.01)

(52) U.S. Cl. ...................................... 375/341; 714/794

(58) Field of Classification Search ................ 375/341, 375/229, 262, 267, 343, 347, 340, 316; 455/133–135; 714/794, 795

See application file for complete search history.

(56) References Cited

U.S. PATENT DOCUMENTS

| 5,117,427 A | 5/1992 | Miyake et al. |
| 5,202,903 A | 4/1993 | Okanoue ................... 375/341 |
| 5,479,419 A | 12/1995 | Naoi et al. .................. 375/341 |
| 5,537,443 A | 7/1996 | Yoshino et al. ............. 375/340 |
| 5,581,581 A | 12/1996 | Sato ........................... 375/341 |
| 5,621,769 A | 4/1997 | Wan et al. .................. 375/341 |
| 5,644,603 A | 7/1997 | Ushirokawa ............... 375/341 |
| 5,680,419 A | 10/1997 | Bottomley .................. 455/132 |
| 5,862,192 A | 1/1999 | Huszar et al. .............. 375/262 |
| 5,953,383 A | 9/1999 | Kojima ....................... 375/347 |

(Continued)

FOREIGN PATENT DOCUMENTS

EP 0237186 A2 9/1987

(Continued)

OTHER PUBLICATIONS

G. D. Forney, Jr., *The Viterbi Algorithm*, Proc. IEEE, vol. 61, No. 3, Mar. 1973, pp. 268-278.

(Continued)

*Primary Examiner*—Tesfadlet Bocure
(74) *Attorney, Agent, or Firm*—Birch, Stewart, Kolasch & Birch, LLP

(57) ABSTRACT

In a sequence estimation method and a sequence estimator of the present invention, a metric is calculated using a received signal and its estimated value, also another metric is calculated using a filtering result via a matching filter, one of these metrics is selected based on a characteristic of the channel or these metrics are combined, when a transmitted signal sequence transmitted from a transmission side is estimated based on a characteristic of a received signal and a channel using a list output Viterbi algorithm for deciding one or a plurality of survivors for each state of the Viterbi algorithm including one or more states. The operation speed and the characteristic of a channel can be improved using the smallest circuit scale even if the characteristic of a channel has a long delay time, in a sequence estimation method and a sequence estimator.

7 Claims, 26 Drawing Sheets

U.S. PATENT DOCUMENTS

| | | | |
|---|---|---|---|
| 6,028,901 A | * | 2/2000 | Huynh et al. .............. 375/350 |
| 6,108,517 A | | 8/2000 | Arslan et al. .............. 455/63 |

FOREIGN PATENT DOCUMENTS

| | | |
|---|---|---|
| EP | 0593763 A1 | 4/1994 |
| EP | 0771079 A | 2/1997 |
| JP | 6-164425 | 6/1994 |
| JP | 6-284094 | 10/1994 |
| JP | 7-45001 | 2/1995 |
| JP | 7-95099 | 4/1995 |
| JP | 7-202957 | 8/1995 |
| JP | 8-23282 | 1/1996 |

OTHER PUBLICATIONS

G. D. Forney, Jr., *Maximum-Likelihood Sequence Estimation of Digital Sequences in the Presence of Intersymbol Interference*, IEEE Transactions on Information Theory, vol. IT-18, No. 3, May 1972, pp. 363-378.

A. Duel-Hallen et al., *Delayed Decision-Feedback Sequence Estimation*, IEEE Transactions on Communications, vol. COM-37, No. 5, May 1989, pp. 428-436.

T. Hashimoto, *A List-Type Reduced-Constraint Generalization of the Viterbi Algorithm*, IEEE Transactions on Information Theory, vol. IT-33, No. 6, Nov. 1987, pp. 866-876.

G. Ungerboeck, *Adaptive Maximum-Likelihood Receiver for Carrier-Modulated Data-Transmission Systems*, IEEE Transactions of Communications, vol. COM-22, No. 5, May 1974, pp. 624-636.

H. Kubo et al., *An Adaptive Maximum-Likelihood Sequence Estimator for Fast Time-Varying Intersymbol Interferences Channels*, IEEE Trans. Commun., vol. COM-42, No. 2/3/4, Feb./Mar./Apr. 1994, pp. 1872-1880.

Makoto Miyake et al., *A property of a Viterbi decoder in which the number of bits of a pass-metric is reduced*, Technical report (B), The Institute of Electronics, Information and Communication Engineers, vol. J71-B, 4, Apr. 1988, pp. 555-562.

K. E. Batcher, *Sorting Networks and their Applications*, Proc. AFIPS 1968 Spring Joint Comput. Conf., vol. 32, pp. 307-314, Apr.-May 1968.

Makoto et al., "Performance of Viterbi Decoding Using Compressed Path Metrics," The institution of Electronics, Information and Communication Engineers, vol. J71-B, 4, pp. 555-562, Apr. 1988.

Black P.J. et al., "A 140-MB/S, 32-State, Radix-4 Viterbi Decoder" IEEE Journal of Solid-State Ciruits, vol. 27, No. 12, Dec. 1, 1992. (pp. 1877-1885) Dec. 1992.

Hashimoto, "A List-Type Reduced-Constraint Generalization of the Viterbi Algorithm," *IEEE Transactions on Information Theory,* Nov. 1987, vol. IT-33, No. 6, 866-876.

kNuth, *The Art of Computer Programming*, vol. 3, "Sorting and Searching," 1973, pp. 180-183.

A.P. Hekstra, "An Alternative to Metric Rescaling in Viterbi Decoders", IEEE transactions on communications, vol. 37, No. 11, Nov., 1989, pp. 1220-1222.

* cited by examiner

SEQUENCE ESTIMATION METHOD AND SEQUENCE ESTIMATOR

This application is a continuation of application Ser. No. 09/083,507, filed on May 22, 1998, now U.S. Pat. No. 6,556,632, the entire contents of which are hereby incorporated by reference and for which priority is claimed under 35 U.S.C. § 120; and this application claims priority of application Ser. No. 9-197092 filed in Japan on Jul. 23, 1997 and application Ser. No. 10-022901 filed in Japan on Feb. 4, 1998 under 35 U.S.C. § 119.

BACKGROUND OF THE INVENTION

1. Field of the Invention

The present invention relates to a sequence estimation method and a sequence estimator for estimating a transmitted signal sequence at a receiving side, and more particularly to, a Viterbi equalization method or a Viterbi decoding method, based on a received signal and characteristic of a channel, or a coding rule in a digital data transmission system such as a car cellular telephone.

2. Description of the Prior Art

Usually, in a digital data transmission, a transmitted signal from a transmission side can not be properly received at a receiving side due to a state of the channel or noise, but the transmitted signal is received in a converted form due to the state of the channel or the noise. A model for the converted signal on the channel is depicted in FIG. 16. As depicted in FIG. 16, the input signal is delayed on the channel and combined with a noise. Accordingly, if the transmitted signal is $I_k$, a received signal $r_k$ is expressed by the following formula (1).

$$r_k = \sum_{i=0}^{L} c_i I_{k-i} + W_k \quad (1)$$

Where, "L" represents a memory length of the channel making the transmitted signal delay, "$c_i$" represents a tap coefficient and "$W_k$" represents a noise component. The tap coefficient and the noise component are determined by a characteristic of the channel. If the tap coefficient is read as a decoding rule, the tap coefficient works as a Viterbi decoding. A receiver receives a received signal $r_k$ and the received signal is estimated by this received signal $r_k$ and the tap coefficient $c_i$. A receiver (a sequence estimator) calculates an estimated value (hereinafter, referred to as "replica") of a received signal by convoluting a candidate of a transmitted signal and a known tap coefficient as in formula (2).

$$r_k^e = \sum_{i=0}^{L} c_i I_{k-i}^e \quad (2)$$

Furthermore, the sequence estimator calculates an error power between an actual received signal and the replica of the received signal calculated from formula (2).

$$\sum_k |e_k|^2 = \sum_k |r_k - r_k^e|^2 \quad (3)$$

The sequence estimator searches a candidate of the transmitted signal having a smallest error power calculated from formula (3), and estimates it as a transmitted signal. Processing of the sequence estimation is explained when the memory length L of the channel is expressed as L=2. FIG. 17 shows a suitable model of the sequence estimator when the memory length L of the channel is 2. The sequence estimator is configured as to reproduce a model similar to that of the channel. An additional device for applying the noise is not necessary for this sequence estimator among the channel models of the channel.

The sequence estimator includes a memory having a memory length the same as that of the channel which receives an estimated value of the transmitted signal, a multiplication device for multiplying the estimated value of the transmitted signal output from the memory by a predetermined tap coefficient, a summing device for calculating a replica of a received signal by summing the multiplied values obtained by the multiplication device, a difference calculation device for calculating the difference between the replica of the received signal output from the summing device and an actual reception signal, and a square summing device for summing the square values output from the difference calculation device. The predetermined tap coefficient set to the multiplication device is the same as the tap coefficient obtained from a characteristic of the channel.

A method for a maximum-likelihood detection according to such a sequence estimator is explained. First, a candidate of the transmitted signal having the transmission sequence length N is received. This candidate of the transmitted signal is input to the memory of the sequence estimator. The multiplication device multiplies each signal output from the memory by tap coefficients $C_1$ and $C_2$. It also multiplies a tap coefficient $C_0$ by the input signal which does not pass through the memory. The summing device obtains a replica of the received signal by summing all values multiplied by the multiplication device. The difference calculation device obtains the difference between the actual received signal and the replica of the received signal obtained from the summing device.

The square summing device sums the square of the difference value output from the difference calculation device. The square summing device provides a sum of the difference value by summing the sum of the square of the difference between the received signal and the replica of the received signal for all signal sequences. The number of candidates of this transmitted signal is $2^N$ when the length of the transmission sequence is N, and all candidates are processed as stated above. A maximum-likelihood detecting device estimates a candidate of the transmitted signal as a transmitted signal when the square sum provided by the square summing device is smallest.

In case of the maximum-likelihood detection, an operation amount increases in proportion to the exponent of the transmission sequence length N. So the maximum-likelihood detection using a Viterbi algorithm is adopted. The details of the Viterbi algorithm are described in the paper "The Viterbi algorithm", G. D. Forney, Jr., Proc. IEEE, vol.61, No.3, pp. 268–278, March 1973. In case of the channel model of FIG. 18, an error power at a time k can be calculated by knowing transmitted data at the time k and transmitted data at the preceding time (k−2). The maximum-likelihood detection using the Viterbi algorithm uses a figure showing data transition information (hereinafter, referred to as a "trellis diagram") obtained from the combination of data between two times as shown in FIG. 19.

In this trellis diagram of FIG. 19, the combination of data between two times is connected with a line considering the following characteristic. The characteristic is expressed as follows. For example, if a signal stored in a memory at certain time shows a state "00", the state transits to any one of a state "10" or a state "00" at a next time, however, it never transits to a state "01" or a state "11". It is because that when a shift resistor of a state "000" is shifted one time, only "000" or "100" is provided. Accordingly, upon connecting a combination of data between two times with a line, it is assumed that the state "00" and the state "10", and the state "00" and the state "00" are connected with lines, respectively. However, the state "00" and the state "01", and the state "00" and the state "11" are not connected with lines, respectively.

In this way, a trellis diagram is formed considering the characteristic of the transition. In FIG. 19, a combination connected with a line has a possibility of transition and a combination not connected with a line has no possibility of transition. A line showing the transition of the state is referred to as a branch hereinafter. The trellis diagram has solid lines and dotted lines. The solid line means that a signal 0 is input and the state transits, while the dotted line means that a signal 1 is input and the state transits. A combination of data across three times can be decided by connecting a combination of data between two times with a line as shown in the trellis diagram of FIG. 19. The error power can be obtained using such a trellis diagram.

Processing of a Viterbi algorithm using such a trellis diagram is explained in detail. When the memory length of the channel is L, the number of states is expressed as $2^L$. In other words, the number of states increases in proportion to exponent of the memory length L of the channel. An operation amount increases corresponding to the number of states. While the sequence estimator of FIG. 16 searches candidates for all signals, the Viterbi algorithm can decrease the number of processing steps for searching them. FIG. 20 shows a process of the Viterbi algorithm at each time. Hereinafter, a state x x of time k is described as "s [k, x x]", and a route which has a state x x at time $k_1$ and transits to a state # # is expressed as "s [$k_1$, x x]/[$k_2$, # #]".

(1) A square error for each branch (a line segment of FIG. 19) is calculated. This square error for each branch is referred to as a branch metric. For example, a branch connecting a state s [0, 00] and a state s [1,00] means that data across three times are [000]. Respective data are multiplied by a tap coefficient, and a difference between the multiplied result and the actual received signal is calculated, and the differential result is squared to calculate a square error. In this way, the square errors are calculated for all branches.

(2) A path for reaching a state at a certain time ("00", "10", "01" and "11" of FIG. 19) is extracted. A path-metric is calculated by accumulating the branch metrics of the branches constructing the extracted paths. The path-metric is calculated for all paths of all states. For example, there are two paths reaching a state s [2,00], namely a path s [0,00]/s, [s[1,00]/s [2,00] and a path s [0,11]/s 1,01]/s [2,00]. The path-metric is calculated for these two paths.

(3) Path-metrics of a plurality of paths which are extracted for each state are compared to each other. This comparison is carried out for all states.

(4) As a result of the comparison, a path having the smallest path-metric is stored as a most reliable path and the smallest path-metric is also stored for every each state. As a result of the comparison, the path having the smallest path-metric is called "survivor" and the path-metric of the survivor is called "survivor-metric". For example, a path-metric of a path s [0,00]/s [1,00]/s [2,00] is compared with a path-metric of a path s [0,11]/s [1,01]/s [2,00], both of which reach the state s [2,00], a smaller path becomes the survivor.

(5) In the Viterbi algorithm, one survivor is finally selected among a plurality of paths reaching a certain state.

It is the Viterbi algorithm that caries out the above processes for each time. FIG. 21 shows a result from carrying out the Viterbi algorithm using the trellis of FIG. 19, and which shows the survivor which is finally obtained. A path having the smallest path-metric is selected as a final path among the survivors at a final time when the above processing is carried out for one frame. In FIG. 21, a path illustrated with a bold solid line and a bold dotted line is the final path. A signal sequence obtained from the final path is estimated as a transmitted signal.

The maximum-likelihood detection using this Viterbi algorithm is called "Maximum-Likelihood Sequence Estimation (MLSE)" which is stated in the paper "Maximum-likelihood sequence estimation of digital sequence in the presence of intersymbol interference", G. D. Forney, Jr., IEEE Trans. Inform. Theory, vol.IT-18, No.3, pp. 363–378, May 1972. In this MLSE, if the memory length of the channel is L, the number of states of the Viterbi algorithm is $2^L$. In this way, the MLSE is a technique for deciding a value of a channel memory uniquely from the branch showing the state transition. FIG. 22 shows a model of a channel at L=5. When the MLSE is applied to this model, the number of states is $2^5$, namely 32.

Although the above MLSE can decrease the number of processing steps compared with the maximum-likelihood detection apparatus of FIG. 16, the number of states increases exponentially according to the memory length L of the channel, so the number of processing is still enormous. A technique for solving this problem is called "Delayed decision-Feedback Sequence Estimation (DFSE)" which is described in a paper "Delayed decision-feedback sequence estimation", A. Duel-Hallen et al., IEEE Trans. Commun., Vol. COM-37, 5, pp. 428–436, May 1989. The technique DFSE changes a part of the processing of the above mentioned MLSE.

An operation difference between the DFSE and the MLSE is briefly explained using FIG. 23. Since the number of channel memories of FIG. 23 equals five, the states have to be formed by the five memories to use all candidates. In this case, the number of states is 32 in the MLSE. Although a channel memory is 5 in DFSE, two memories are considered to make states. If states are formed from two memories, however, data for three symbols in the latter half are insufficient to use the memory of the channel. Therefore, the value obtained from the survivor is used as data for three symbols in the latter half of the survivor using the survivors connected to the state at the time (k−1). Applying such DFSE can reduce the number of states from 32 to 4.

A list output Viterbi algorithm which is an expansion of the Viterbi algorithm is described in a paper "A list-type reduced-constraint generalization of the Viterbi algorithm", T. Hashimoto, IEEE Trans. Inform. Theory, vol. IT-33, 6, pp. 866–876, November 1987. The list output Viterbi algorithm generalizes the Viterbi algorithm as follows:

a memory length of the Viterbi algorithm is set shorter than the constraint length L of the channel or the code, and the number of the survivors which is connected to each state is generalized to S instead of one.

The former generalization is the same concept as that of DFSE. On the other hand, in the latter generalization, assuming two value transmission, S paths with the highest likelihood are selected among 2S entry paths. In this way, since this algorithm prepares the list based on the metric for each state, it is called a list output Viterbi algorithm instead of a general Viterbi algorithm.

The operation of the list output Viterbi algorithm is depicted in FIG. 24 when the number of states is four and the number S of survivors is two. Solid lines express survivors having the highest likelihood in each state and dotted lines describe survivors having the second higher likelihood in each state. In each state, two survivors are stored. For example, in a state "00" at time k, there are transitions from a state "00" and a state "01" at time (k−1). In a state "00" at time (k−1), there a two kinds of survivors from a state "00" and a state "01" at time (k−2). Similarly, in a state "01" at time (k−1), there are two kinds of survivors from a state "10" and a state "11" at time (k−2).

In a state "00" at time k, a path-metric is calculated for the above four paths and two higher paths among them are regarded as survivors. The survivors do not always selected from a state "00" at time (k−1) and other from a state "01" at time (k−1). There is a possibility that both paths are selected from a state "00" at a time (k−1) as shown both in the solid and dotted lines. In this case, states of these two survivors at time (k−1) are the same, but states at time (k−2) are different. Such flexibility is a specific feature of the list output Viterbi algorithm. To select two paths among four paths, it is necessary to arrange the paths in the order of path-metrics. In other words, sorting is necessary. Generally, a large operation amount is necessary for sorting, and a long processing time is necessary even if the algorithm is realized by a circuit.

FIG. 25 is a block diagram showing a comparison/selection processing in the ordinary Viterbi algorithm. The block diagram of FIG. 25 includes survivor input terminals 33, path-metric input terminals 34, a survivor output terminal 35, a path-metric output terminal 36, a selector B 39-2 and a comparator 100. The comparator 100 outputs the selection information to compare the values of two path-metrics and select a smaller one. The selector B 39-2 selects one of the two survivors and two path-metrics based on the above selection information.

FIG. 26 is a block diagram showing a comparison/selection processing in the list output Viterbi algorithm. In this block diagram, it is assumed that the list output Viterbi algorithm is a model of S=4 which means four path-metrics are selected from the eight path-metrics. The block diagram of FIG. 26 includes survivor input terminals 33, path-metric input terminals 34, survivor output terminals 35, path-metric output terminals 36, a selector A 39-1 and a sorting comparator 101. The sorting comparator 101 compares the eight path-metrics, arranges the results in an ascending order from a smallest one, and outputs the selection information which selects four smaller ones. The selector A 39-1 selects respective four survivors from eight survivors and eight path-metrics based on the above selection information.

FIG. 27 is a detailed construction of the sorting comparator 101 of FIG. 26. The block diagram of FIG. 27 includes a selection information output terminal 42, path-metric input terminals 104 and an 8/1 comparator 106-1. The 8/1 comparator 106-1 selects the smallest path-metric among eight path-metrics, and outputs an address for identifying this path-metric used for the selection information. Next, an 8/1 comparator 106-2 selects the second smaller path-metric among eight path-metrics. The 8/1 comparator 106-3 and an 8/1 comparator 106-4 operates in the same manner.

FIG. 28 is a detailed construction of the 8/1 comparator 106 of FIG. 27. The block diagram of FIG. 28 includes 2/1 comparators 40, a compulsory maximum value insertion circuit 102, compulsory maximum value insertion indicating input terminals 103, path-metric input terminals 104 and a path-metric selection information output terminal 105. The compulsory maximum value insertion circuit 102 receives the compulsory maximum value insertion indication signal and forcibly inserts the maximum value into a specific terminal of the path-metric. Then, the 2/1 comparators 40 searches the smallest path-metric by a tournament system and outputs the pathmetric selection information.

In case that a sorting from 2S to S is carried out under the survivor number is S, the total number of the 2/1 comparators is $(2S^2-S)$ and the number of the maximum stages of the 2/1 comparator is $(\log_2 S+1)$ S. In other words, according to the increase of S, a circuit scale increases in proportion to $2S^2$ and a delay time increases in proportion to $S \log_2 S$. Usually, a branch of square Euclidean distance expressed in the formula (3) is used for a metric value of the Viterbi algorithm. If a branch metric is Γk at time k, formula (4) is obtained.

$$\Gamma_k = |r_k - r_k^e|^2 = \left| r_k - \sum_{i=0}^{L} c_i J_{k-i} \right|^2 \quad (4)$$

On the other hand, the following branch metric shown by formula (5) is suggested by the paper "Adaptive maximum-likelihood receiver for carrier-modulated data-transmission systems", G. Ungerboeck, IEEE Trans. Commun., Vol. COM-22, No.5, pp. 624–636 May 1974.

$$\Gamma_k = -2\mathrm{Re}[y_k I_k^*] + x_0|I_k|^2 + 2\mathrm{Re}\left[\sum_{s=1}^{} x_s I_k^* I_{k-s}\right] \quad (5)$$

In the above, * denotes complex conjugation and $y_k$ and $x_s$ are defined as follows in the formulas (6) and (7), respectively.

$$y_k = \sum_{i=0}^{L} c_i^* r_{k+i} \quad (6)$$

$$x_s = \sum_{i=0}^{L-s} c_i^* c_{i+s} \quad (7)$$

$y_k$ is equivalent to a matching filter output and $x_s$ is equivalent to an auto-correlation of the characteristic of the channel.

A square metric and a modified metric are equal if the perfect Viterbi algorithm (MLSE) is used. But if DFSE is used, their bit error rates (BER) are different. FIG. 29 shows BER characteristic when the tap coefficient of the characteristic of the channel is 1, 2, 0, 0, 0, 4, and the memory length L of the channel is five. FIG. 30 shows BER characteristic when the tap coefficient of the characteristic of the channel is 1, 0, 1, 0, 1, 0, and the memory length L of the channel is five. In FIG. 29 and in FIG. 30, Sqr. indicates a square metric and Mod. indicates a modified metric. Upon using DFSE, the most suitable metric is decided between the square metric and the modified metric according to the characteristic of the channel. In FIG. 30, the BER of the modified metric greatly deteriorates.

In a conventional sequence estimation method, there is a problem that a circuit scale increases in proportion to a power of the memory length of the channel according to the increase of the number of states, if MLSE is used in the channel having a long delay time. If the list output Viterbi algorithm is used and the number of the survivors S is more than two, a sorting processing is needed. Therefore, there occurs another problem that the circuit scale increases and the operational speed becomes slow since the processing volume increases according to the increase of elements of the sorting object.

Further, if the modified metric is used for calculating the branch metric, there is a problem that the characteristic remarkably deteriorates in the channel having a large time dispersion of an auto-correlation of the channel impulse response (CIR). If the square metric is used for calculating the branch metric, there is a problem that the characteristic remarkably deteriorates in the channel having a large time dispersion of a tap power of a channel impulse response (CIR).

SUMMARY OF THE INVENTION

It is an object of the present invention to increase the operation speed under the minimum circuit scale in the channel having a long delay time, and to provide a sequence estimation method and a sequence estimator which can improve the characteristic thereof.

It is another object of the present invention not to largely degrade the estimated characteristic by the transmission characteristic, and to improve the estimated characteristic rather than when the metric is fixed to any one of the metrics.

It is a further object of the present invention to improve the estimated characteristic rather than when the metric is fixed to any one of the square metric or the modified metric.

It is a still further object of the present invention to surely select the metric in response to the transmission characteristic.

According to one aspect of the invention, a sequence estimation method for estimating a transmitted signal sequence transmitted from a transmission side based on a characteristic of a received signal and a channel using a list output Viterbi algorithm to decide one or a plurality of survivors for each state of a Viterbi algorithm including one or more states includes a plurality of metric calculation steps.

According to another aspect of the invention, a sequence estimation method for estimating a transmitted signal sequence transmitted from a transmission side based on a characteristic of a received signal and a channel using a list output Viterbi algorithm to decide one or a plurality of survivors for each state of a Viterbi algorithm including one or more states includes a plurality of metric calculation steps; and a metric selection step for selecting a metric calculated by the plurality of metric calculation steps.

According to other aspect of the invention, a sequence estimation method for estimating a transmitted signal sequence transmitted from a transmission side based on a characteristic of a received signal and a channel using a list output Viterbi algorithm to decide one or a plurality of survivors for each state of a Viterbi algorithm including one or more states includes a plurality of metric calculation steps; and a metric combining step for weighted-summing metrics calculated by the plurality of metric calculation steps.

According to another aspect of the invention, a sequence estimation method for estimating a transmitted signal sequence transmitted from a transmission side based on a characteristic of a received signal and a channel using a list output Viterbi algorithm to decide one or a plurality of survivors for each state of a Viterbi algorithm including one or more states includes a first metric calculation step for calculating a metric using the received signal and its estimated value; a second metric calculation step for calculating a metric using a filtering result obtained via a matching filter, and a metric combining step for weighted-summing metrics calculated by the first and the second metric calculation steps based on a characteristic of the channel.

According to further aspect of the invention, a sequence estimation method for estimating a transmitted signal sequence transmitted from a transmission side based on a characteristic of a received signal and a channel using a list output Viterbi algorithm to decide one or a plurality of survivors for each state of a Viterbi algorithm including one or more states comprises the steps of a first metric calculation step for calculating a metric using the received signal and its estimated value a second metric calculation step for calculating a metric using a filtering result obtained via a matching filter, and a metric selection step for selecting a metric calculated by the first and the second metric calculation steps based on a characteristic of the channel.

According to another aspect of the invention, in the sequence estimation method, the first metric calculation step calculates a square metric and the second metric calculation step calculates a modified metric.

According to further aspect of the invention, the metric selection step estimates a characteristic of the channel by an impulse response of the channel, calculates and compares a residual intersymbol interference power and a residual correlation power, and selects a metric calculated by the second metric calculation step if its residual intersymbol interference power is higher, and selects a metric selected by the first metric calculation step if its residual correlation power is higher.

According to further aspect of the invention, a sequence estimation method for estimating a transmitted signal sequence transmitted from a transmission side based on a characteristic of a received signal and a channel using a list output Viterbi algorithm to decide one or a plurality of survivors for each state of a Viterbi algorithm including one or more states, includes a selection processing step for selecting higher order S survivors instead of sorting in the order of metrics and decreasing the number of bits of a metric by conversion upon selecting S survivors according to a metric value.

According to further aspect of the invention, a sequence estimation method for estimating a transmitted signal sequence transmitted from a transmission side based on a characteristic of a received signal and a channel using a list output Viterbi algorithm to decide one or a plurality of survivors for each state of a Viterbi algorithm including one or more states, includes the steps of, a first comparison step for dividing $2^{U-1}$ (U is an integer larger than 2) inputs into higher $2^{U-2}$ and lower $2^{U-2}$ according to a predetermined selection order and outputs the higher selection output, a second comparison steps for dividing $2^{U-1}$ (U is an integer larger than 2) inputs into higher $2^{U-2}$ and lower $2^{U-2}$ according to a predetermined selection order and outputs the lower selection output, a third comparison step for receiving the higher selection output of the first comparison step and the lower selection output of the second comparison step, and dividing $2^{U-1}$ inputs into higher $2^{U-2}$ and lower $2^{U-2}$ according to the selection order and output a higher selection output and a lower selection output, and a fourth comparison step for receiving the lower selection output of the first comparison step and the higher selection output of the second comparison step, and dividing $2^{U-1}$ inputs into higher $2^{U-2}$ and lower $2^{U-2}$ according to the selection order and outputs a higher selection output and a lower selection output, wherein the method compares $2^U$ input information of survivors and/or of path-metrics in the first and the second comparison steps as $2^{U-1}$ first input information and $^{U-1}$ second input information, respectively, and selects $2^{U-1}$ survivors and/or $2^{U-1}$ path-metrics from the third and the fourth comparison steps, respectively, as a higher order selection outputs according to a predetermined selection order.

According to further aspect of the invention, a sequence estimation apparatus for estimating a transmitted signal sequence transmitted from a transmission side based on a characteristic of a received signal and a channel using a list output Viterbi algorithm to decide one or a plurality of survivors for each state of a Viterbi algorithm including one or more states includes a plurality of metric calculators.

According to further aspect of the invention, a sequence estimation apparatus for estimating a transmitted signal sequence transmitted from a transmission side based on a characteristic of a received signal and a channel using a list output Viterbi algorithm to decide one or a plurality of survivors for each state of a Viterbi algorithm including one or more states includes a plurality of metric calculators; and a metric selector for selecting one of metrics calculated by the plurality of metric calculators.

According to further aspect of the invention, a sequence estimation apparatus for estimating a transmitted signal sequence transmitted from a transmission side based on a characteristic of a received signal and a channel using a list output Viterbi algorithm to decide one or a plurality of survivors for each state of a Viterbi algorithm including one or more states includes a plurality of metric calculators; and a metric combinor for weighted-summing metrics calculated by the plurality of metric calculators.

According to further aspect of the invention, a sequence estimation apparatus for estimating a transmitted signal sequence transmitted from a transmission side based on a characteristic of a received signal and a channel using a list output Viterbi algorithm to decide one or a plurality of survivors for each state of a Viterbi algorithm including one or more states includes a first metric calculator for calculating a metric using the received signal and its estimated value; a second metric calculator for calculating a metric using a filtering result obtained via a matching filter; and a metric combinor for weighted-summing metrics calculated by the first and the second metric calculators based on a characteristic of the channel.

According to further aspect of the invention, a sequence estimation apparatus for estimating a transmitted signal sequence transmitted from a transmission side based on a characteristic of a received signal and a channel using a list output Viterbi algorithm to decide one or a plurality of survivors for each state of a Viterbi algorithm including one or more states, includes first metric calculator for calculating a metric using the received signal and its estimated value, second metric calculator for calculating a metric using a filtering result obtained via a matching filter, and metric selector for selecting a metric calculated by the first and the second metric calculator based on a characteristic of the channel.

According to further aspect of the invention, in the sequence estimation apparatus, the first metric calculator calculates a square metric and the second metric calculator calculates a modified metric.

According to further aspect of the invention, the metric selector includes residual intersymbol interference power calculator for calculating a residual intersymbol interference power and residual correlation power calculator for calculating a residual correlation power, wherein the metric selector estimates a characteristic of the channel by an impulse response of the channel, and selects a metric calculated by the second metric calculator if the residual intersymbol interference power is higher, and selects a metric selected by the first metric calculator if the residual correlation power is higher.

According to further aspect of the invention, a sequence estimation apparatus for estimating a transmitted signal sequence transmitted from a transmission side based on a characteristic of a received signal and a channel using a list output Viterbi algorithm to decide one or a plurality of survivors for each state of a Viterbi algorithm including one or more states, includes selection processor for selecting S survivors by a metric value, selector for selecting higher order S survivors instead of sorting in order of metrics and bit number convertor for decreasing the number of bits of a metric by conversion.

According to further aspect of the invention, a sequence estimation apparatus for estimating a transmitted signal sequence transmitted from a transmission side based on a characteristic of a received signal and a channel using a list output Viterbi algorithm to decide one or a plurality of survivors for each state of a Viterbi algorithm including one or more states, includes first comparator for dividing $2^{U-1}$ (U is an integer larger than 2) inputs into higher $2^{U-2}$ and lower $2^{U-2}$ according to a predetermined selection order and outputs the higher selection output, second comparator for dividing $2^{U-1}$ (U is an integer larger than 2) inputs into higher $2^{U-2}$ and lower $2^{U-2}$ according to a predetermined selection order and outputs the lower selection output, third comparator for receiving the higher selection output of the first comparator and the lower selection output of the second comparator, and dividing $2^{U-1}$ inputs into higher $2^{U-2}$ and lower $2^{U-2}$ according to the selection order and output a higher selection output and a lower selection output, and fourth comparator for receiving the lower selection output of the first comparator and the higher selection output of the second comparator, and dividing $2^{U-1}$ inputs into higher $2^{U-2}$ and lower $2^{U-2}$ according to the selection order and outputs a higher selection output and a lower selection output, wherein the apparatus compares $2^U$ input information of survivors and/or of path-metrics in the first and the second comparator as $2^{U-1}$ first input information and $2^{U-1}$ second input information, respectively, and selects $2^{U-1}$ survivors and/or $2^{U-1}$ path-metrics from the third and the fourth comparator, respectively, as a higher order selection outputs according to a predetermined selection order.

BRIEF DESCRIPTION OF THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
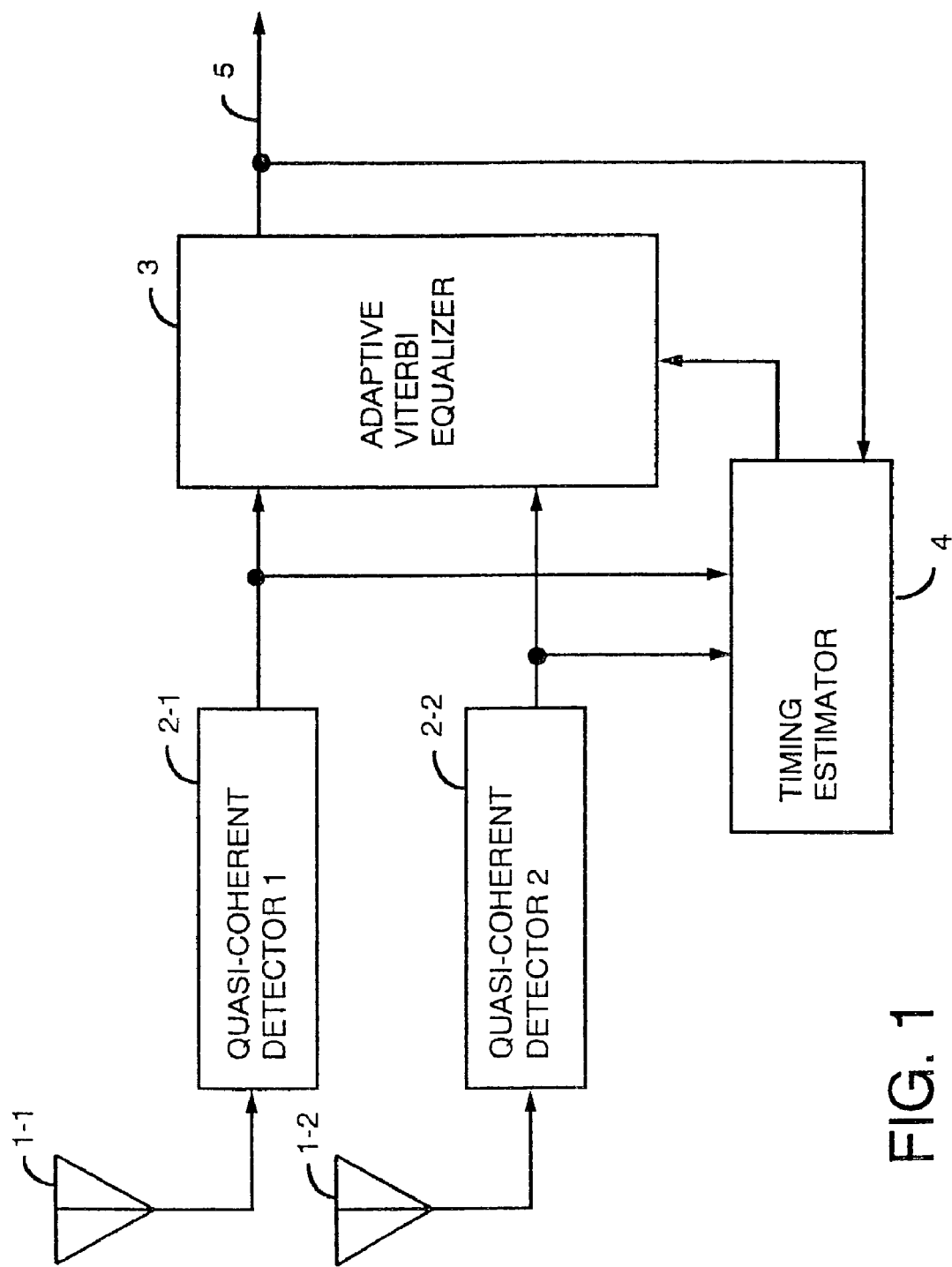
FIG. 1 is a block diagram showing a position of a Viterbi equalizer in a receiver of the present invention.

FIG. 1 shows a Viterbi equalizer in a receiver which uses the Viterbi algorithm. The Viterbi equalizer of FIG. 1 includes antennas 1, quasi-coherent detectors 2, an adaptive Viterbi equalizer 3, a timing estimator 4, and a decision output terminal 5. In the Viterbi equalizer of FIG. 1, a transmitted signal is input from the antenna via the channel, is semi-synchronously detected and becomes a base band reception signal. The timing estimator 4 receives this received signal to reproduce a timing signal. The adaptive Viterbi equalizer 3 receives the received signal and the timing signal and output an estimation value of transmitted data (a decision).

Figure 2:
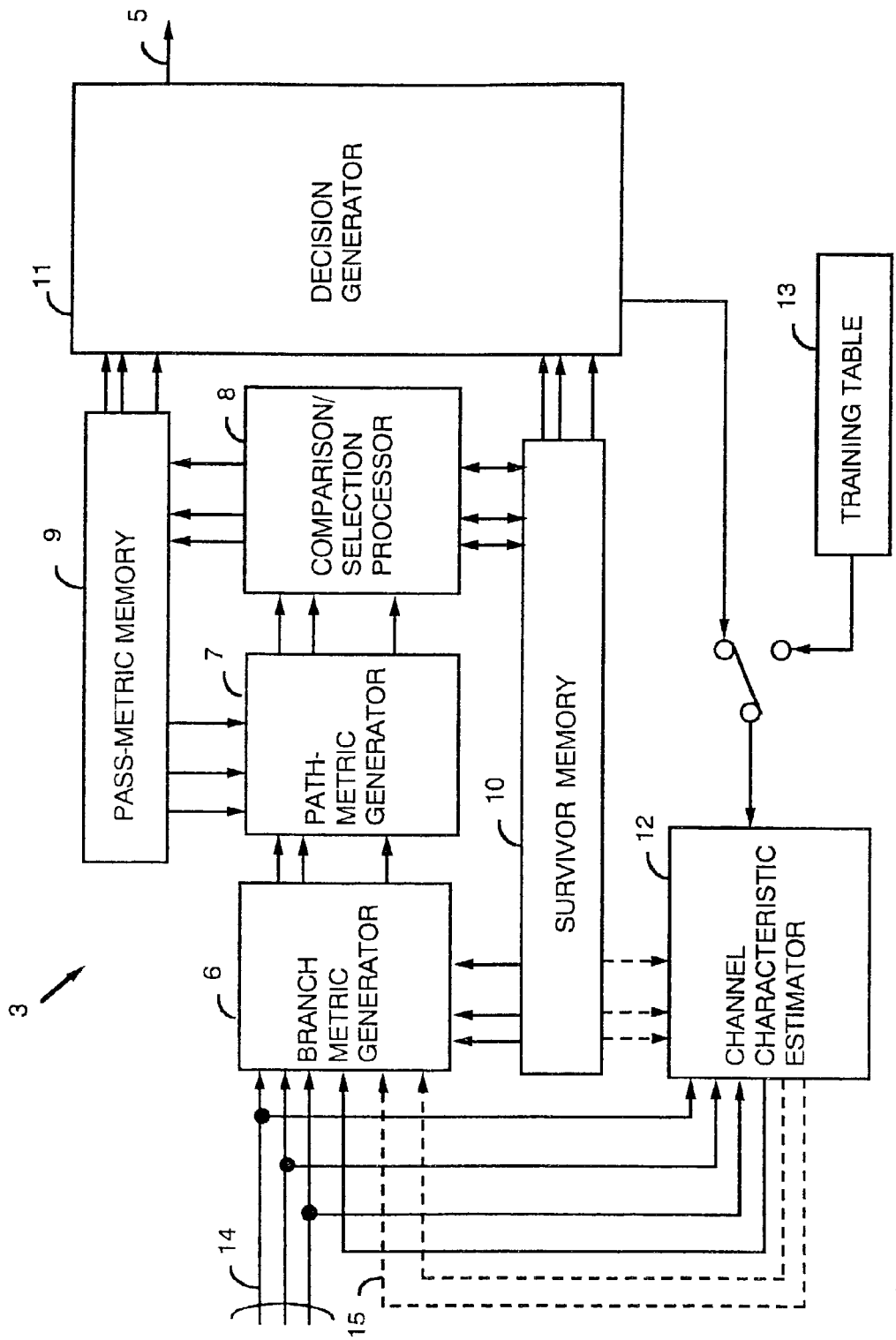
FIG. 2 is a block diagram showing the Viterbi equalizer in the receiver of FIG. 1.

FIG. 2 shows an adaptive Viterbi equalizer 3 of FIG. 1 in more detail. The adaptive Viterbi equalizer 3 of FIG. 2 includes a decision output terminal 5, a branch metric generator 6, a path-metric generator 7, a comparison/selection processor 8, a path-metric memory 9, a survivor memory 10, a decision generator 11, a channel characteristic estimating device 12, a training table 13 and received signal input terminals 14. The branch metric generator 6 receives the received signal from the quasi-coherent detectors 2, a channel characteristic from the channel characteristic estimating device 12 and a survivor from the survivor memory 10 and forms a branch metric. The path-metric generator 7 receives the branch metric and a path-metric input from the path-metric memory 9 and forms a path-metric.

The comparison/selection processor 8 receives the path-metric formed by the path-metric generator 7 for carrying out comparison/selection processing, and outputs a path-metric and a survivor to the path-metric memory 9 and the survivor memory 10 in response to the selection information. The decision generator 11 receives the path-metric from the path memory after comparison/selection processing and outputs a decision. The channel characteristic estimating device 12 estimates a channel characteristic from the received signal and a decision from the decision generator 11 or data input from the training table 13. The channel estimation method is described in detail, for example, in the paper "An adaptive maximum-likelihood sequence estimator for fast time-varying intersymbol interference channels", H. Kubo et al., IEEE Trans. Commun., Vol. COM-42, No. 2/3/4, pp. 1872–1880, February/March/April, 1994.

Embodiment 1.

Figure 3:
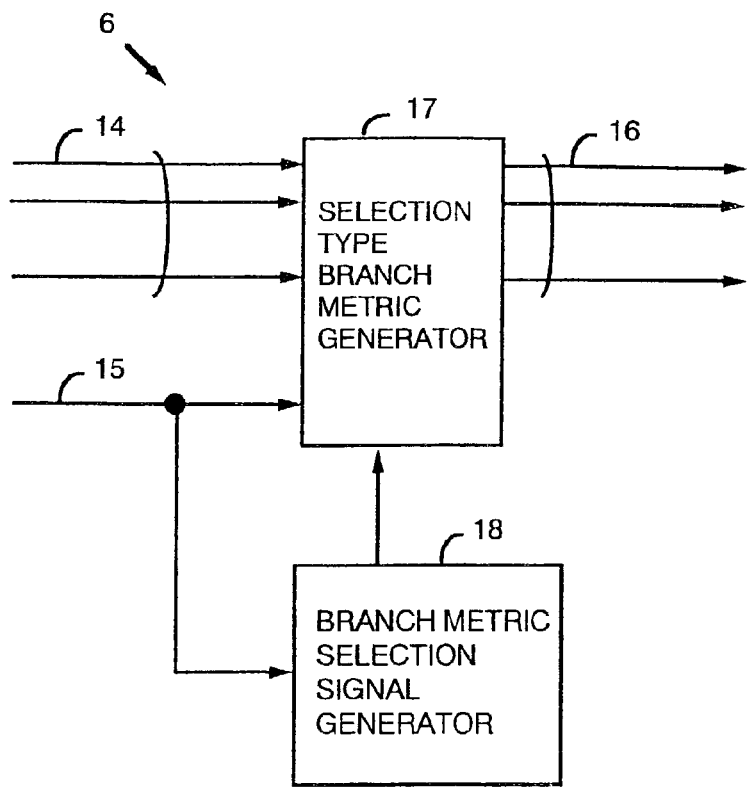
FIG. 3 is a block diagram showing a branch metric generator of FIG. 2 of the first embodiment of the present invention.

FIG. 3 shows a detailed construction of the branch metric generator 6 of FIG. 2. The branch metric generator of FIG. 3 includes received signal input terminals 14, a channel characteristic input terminal 15, branch metric output terminals 16, a selecting-type branch metric forming circuit 17 and a branch metric selection signal forming circuit 18. The selecting-type branch metric forming circuit 17 switches a branch metric forming reference to a square metric and a modified metric according to a metric selection signal from the branch metric selection signal forming circuit 18.

Figure 4:
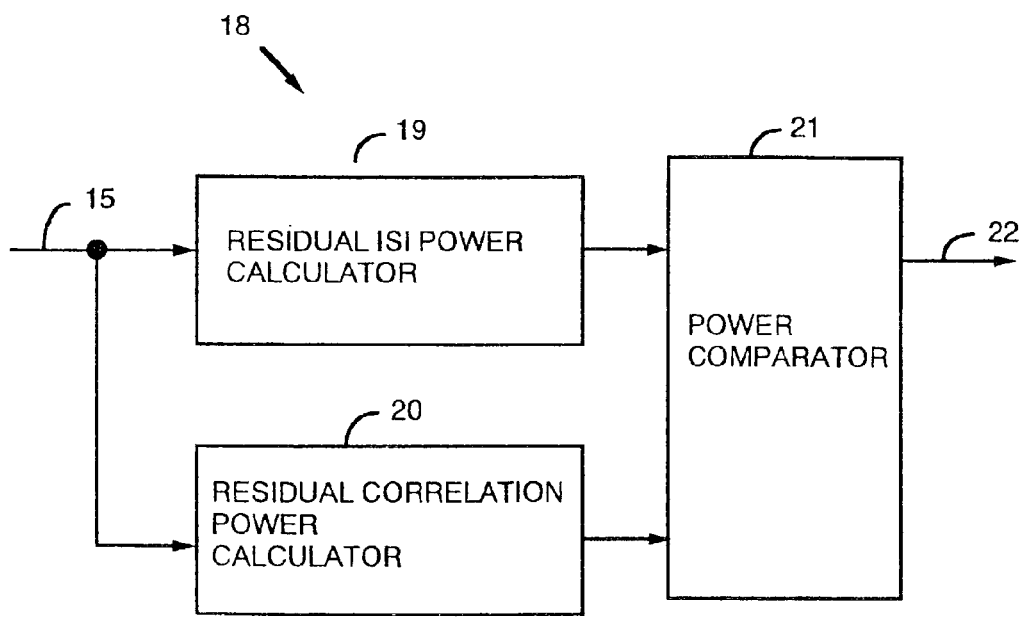
FIG. 4 is a block diagram showing a branch metric selection signal forming circuit in the branch metric generator of FIG. 3.

FIG. 4 shows a detailed construction of the branch metric selection signal forming circuit 18 of FIG. 3. The branch metric selection signal forming circuit 18 of FIG. 4 includes a channel characteristic input terminal 15, a residual ISI power calculation circuit 19, a residual correlation power calculation circuit 20, a power comparator 21 and a selection signal input/output terminal 22. Assuming that the memory length of the channel is L and the memory length of the trellis of the Viterbi algorithm is V, the residual ISI power calculation circuit 19 calculates a power PA as formula (8).

$$PA = \sum_{i=L+1}^{V} |c_i|^2 \quad (8)$$

The residual correlation power calculation circuit 20 calculates a power PB in a similar way using formula (9).

$$PB = 2 \sum_{s=L+1}^{V} \text{Re}[x_s] \quad (9)$$

In formula (9), $x_s$ is a value defined in formula (7). The power comparator 21 compares PA and PB, and outputs a selection signal for selecting the modified metric if PA is larger, a signal for selecting the square metric if PB is larger.

Figure 5:
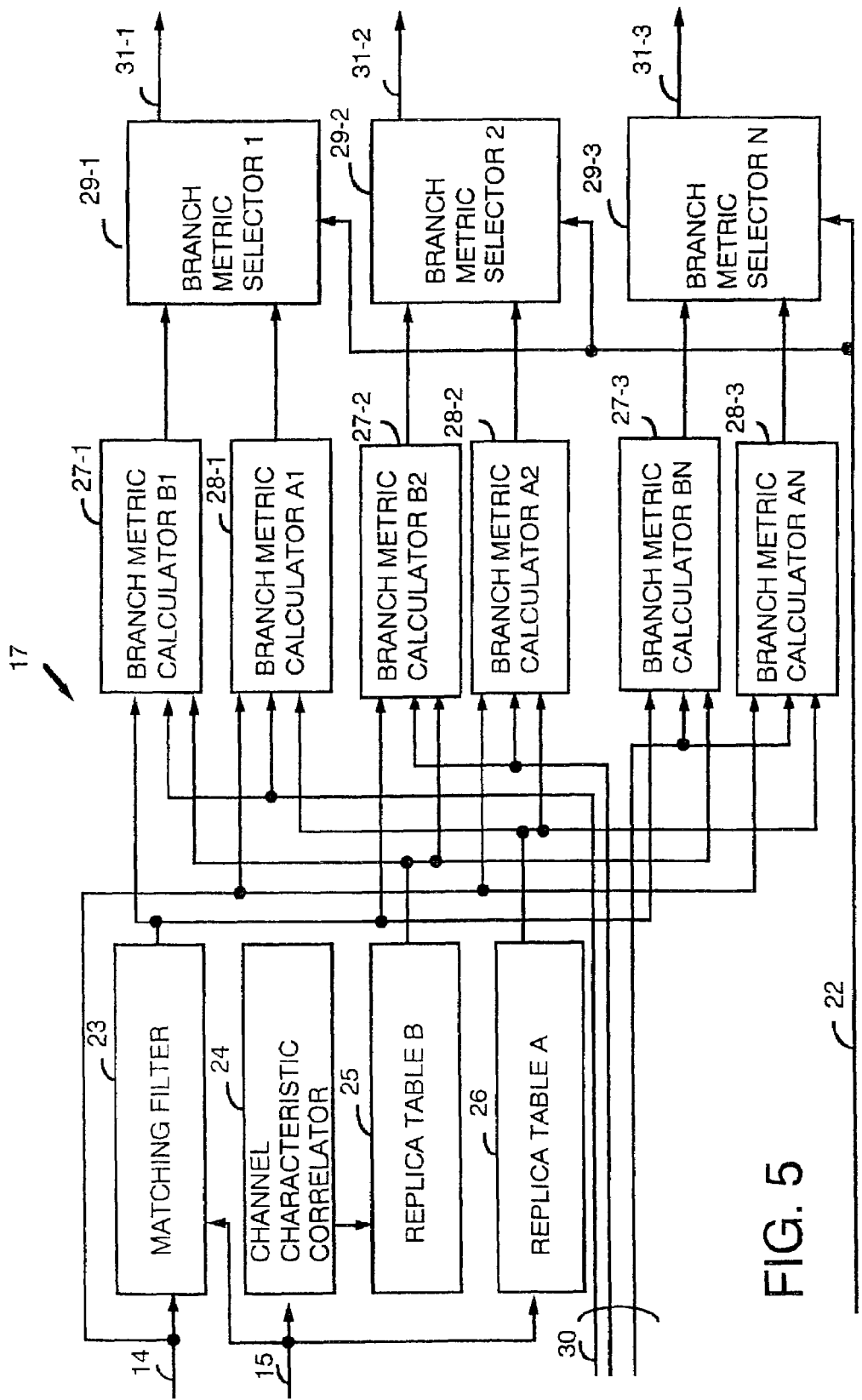
FIG. 5 is a block diagram showing a selecting-type branch metric forming circuit in the branch metric generator of FIG. 3.

FIG. 5 shows a detailed construction of the selecting-type branch metric forming circuit 17 of FIG. 3. The selecting-type branch metric forming circuit 17 of FIG. 5 includes a received signal input terminal 14, a channel characteristic input terminal 15, a selection signal input/output terminal 22, a matching filter 23, a channel characteristic correlator 24, a replica table B 25, a replica table A 26, N branch metric calculators B 27, N branch metric calculators A 28, branch metric selection circuits 29, N data candidate value input terminals 30 where the data is decided by the trellis and the survivor, and N branch metric output terminals 31, where, N represents a total number of branch metrics.

The matching filter 23 carries out matching filtering of the received signal according to the channel characteristic. The channel characteristic correlator 24 receives the channel characteristic and outputs a correlation value thereof. The replica table B 25 forms a replica table used for the modified metric. The replica table A 26 forms a replica table used for the square metric. The respective branch metric calculator B 27 receives an output from the matching filter 23, a value from the replica table B 25 and a data candidate value decided by the trellis and the survivor path, and calculates a modified metric. The respective branch metric calculator A 28 receives a receiving signal, a value from the replica table A 26 and the data candidate value decided by the trellis and the survivor path, and calculates a square metric. The respective branch metric selection circuit 29 selects one of the outputs from the corresponding branch metric calculator B 27 and the corresponding branch metric calculator A 28 and outputs one of them to the respective branch metric output terminals 31 according to the selection information.

Figure 6:
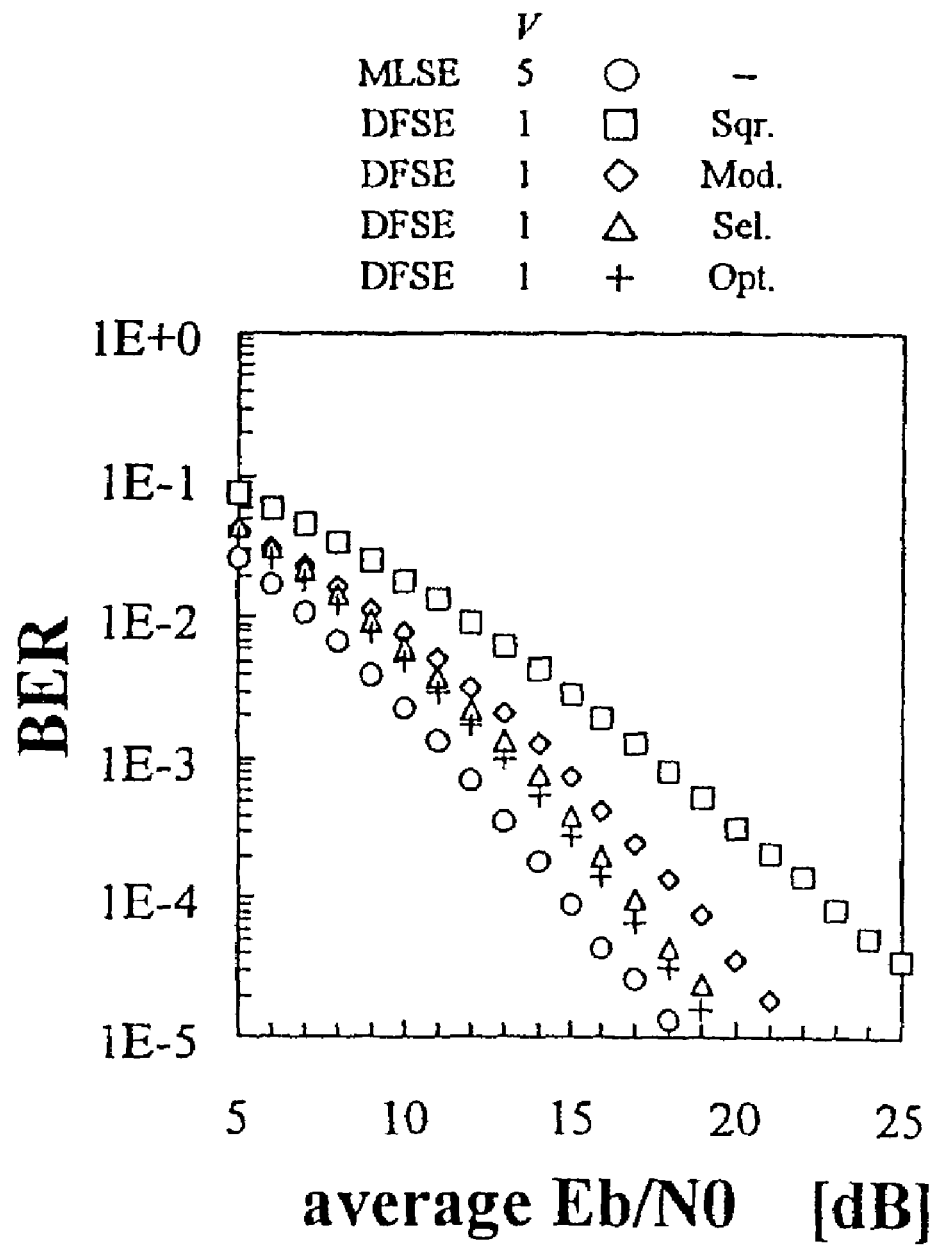
FIG. 6 shows characteristics of a bit error rate (BER) characteristic of six waves each having an equal power under the Rayleigh fading by the sequence estimation method of the first embodiment of the present invention.

FIG. 6 shows a bit error rate (BER) characteristic of six waves each having an equal power under the Rayleigh fading. In FIG. 6, MLSE means a case when a memory length V of a trellis in Viterbi Algorithm is five, DFSE means a case when the memory length V is one, Sqr. means a case when a square metric is used, Mod. means a case when a modified metric is used, Sel. means a case when this invention is used, and Opt. means a case when less errors for every slot in Sqr. or Mod. is selected. Sqr. and Mod. corresponds to a conventional example and Opt. corresponds to a limit value. FIG. 6 shows that this invention can realize a more favorable BER characteristic than the conventional example.

Embodiment 2.

Figure 7:
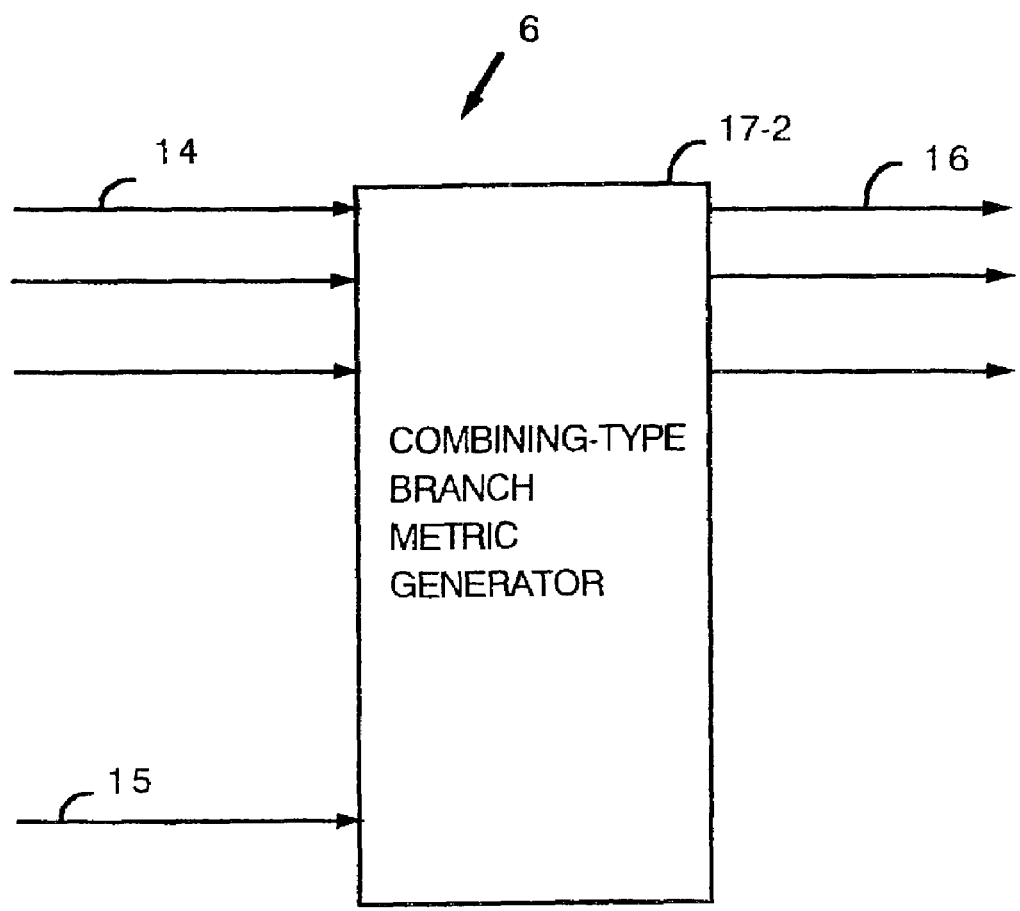
FIG. 7 is a block diagram showing a branch metric generator of FIG. 2 of a second embodiment of the present invention.

FIG. 7 shows a combining-type branch metric generator in the second embodiment of the present invention, which is included in the branch metric generator 6 in FIG. 2. In FIG. 7, the combining-type branch metric generator 17-2 comprises a received signal input terminal 14, a channel characteristic input terminal 15, a branch metric output terminal 16. The combining-type branch metric generator 17-2 generates a square metric and the modified type metric and outputs a branch metric by weighted-summing the two values of the square metric and the modified type metric.

Figure 8:
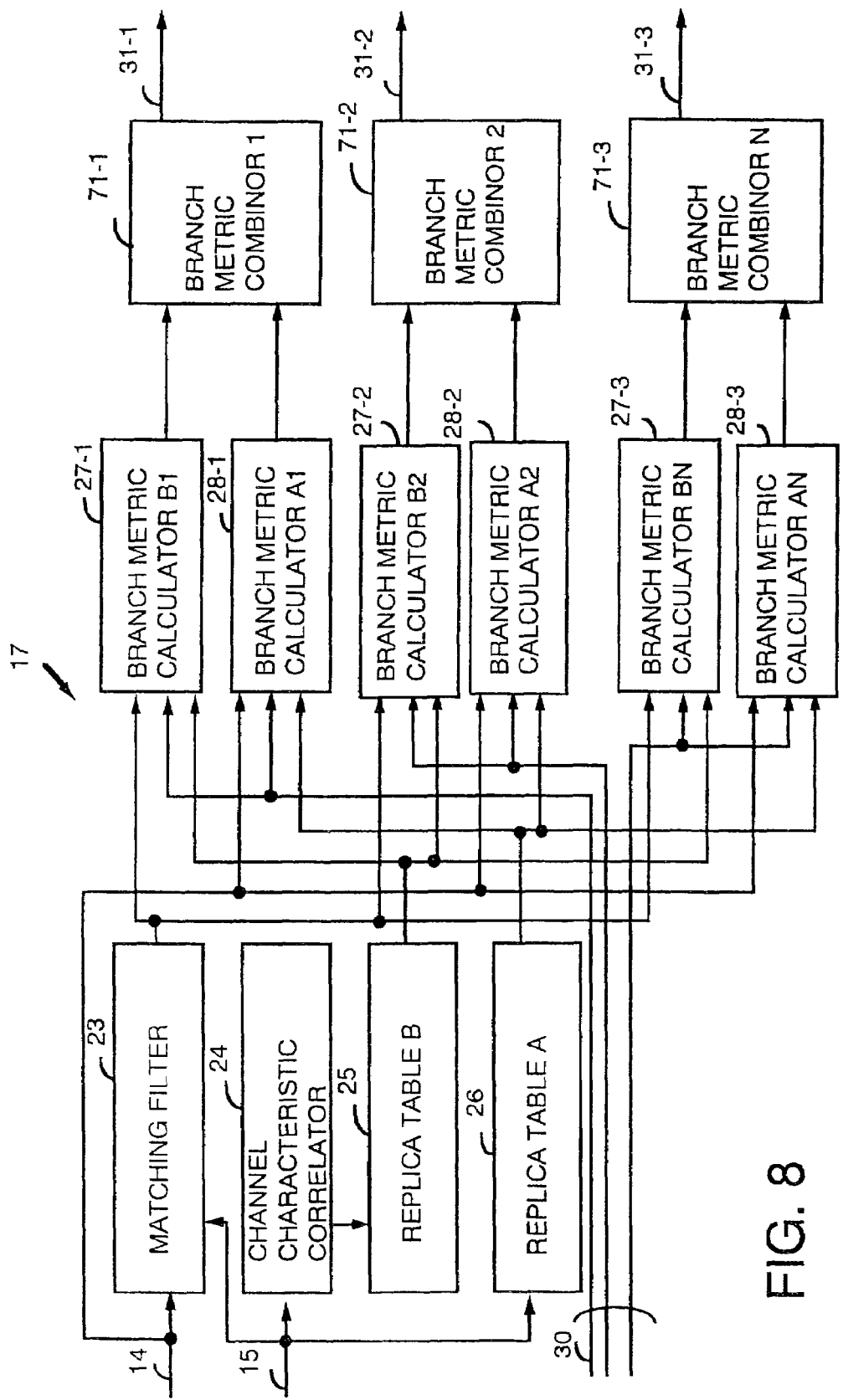
FIG. 8 is a block diagram showing a combining-type branch metric forming circuit of FIG. 7.

FIG. 8 shows a detailed construction of the combining-type branch metric forming circuit 17-2 of FIG. 7. The combining-type branch metric forming circuit 17-2 of FIG. 8 includes a received signal input terminal 14, a channel characteristic input terminal 15, a matching filter 23, a channel characteristic correlator 24, a replica table B 25, a replica table A 26, N branch metric calculators B 27 (27-1~27-3), N branch metric calculators A 28 (28-1~28-3), branch metric combining circuits 71 (71-1~71-3), N data candidate value input terminals 30 where the data is decided by the trellis and the survivor, and N branch metric output terminals 31 (31-1~31-3), where, N represents a total number of branch metrics.

The matching filter 23 carries out matching filtering of the received signal according to the channel characteristic. The channel characteristic correlator 24 receives the channel characteristic and outputs a correlation value thereof. The replica table B 25 forms a replica table used for the modified metric. The replica table A 26 forms a replica table used for the square metric. The respective branch metric calculator B 27 receives an output from the matching filter 23, a value from the replica table B 25 and a data candidate value decided by the trellis and the survivor path, and calculates a modified metric. The respective branch metric calculator A 28 receives a receiving signal, a value from the replica table A 26 and the data candidate value decided by the trellis and the survivor path, and calculates a square metric. The respective branch metric combining circuits 71 weighted-combine the outputs from the corresponding branch metric calculators B 27 and the corresponding branch metric calculators A 28 and output the results to the respective branch metric output terminals 31.

Embodiment 3.

Figure 9:
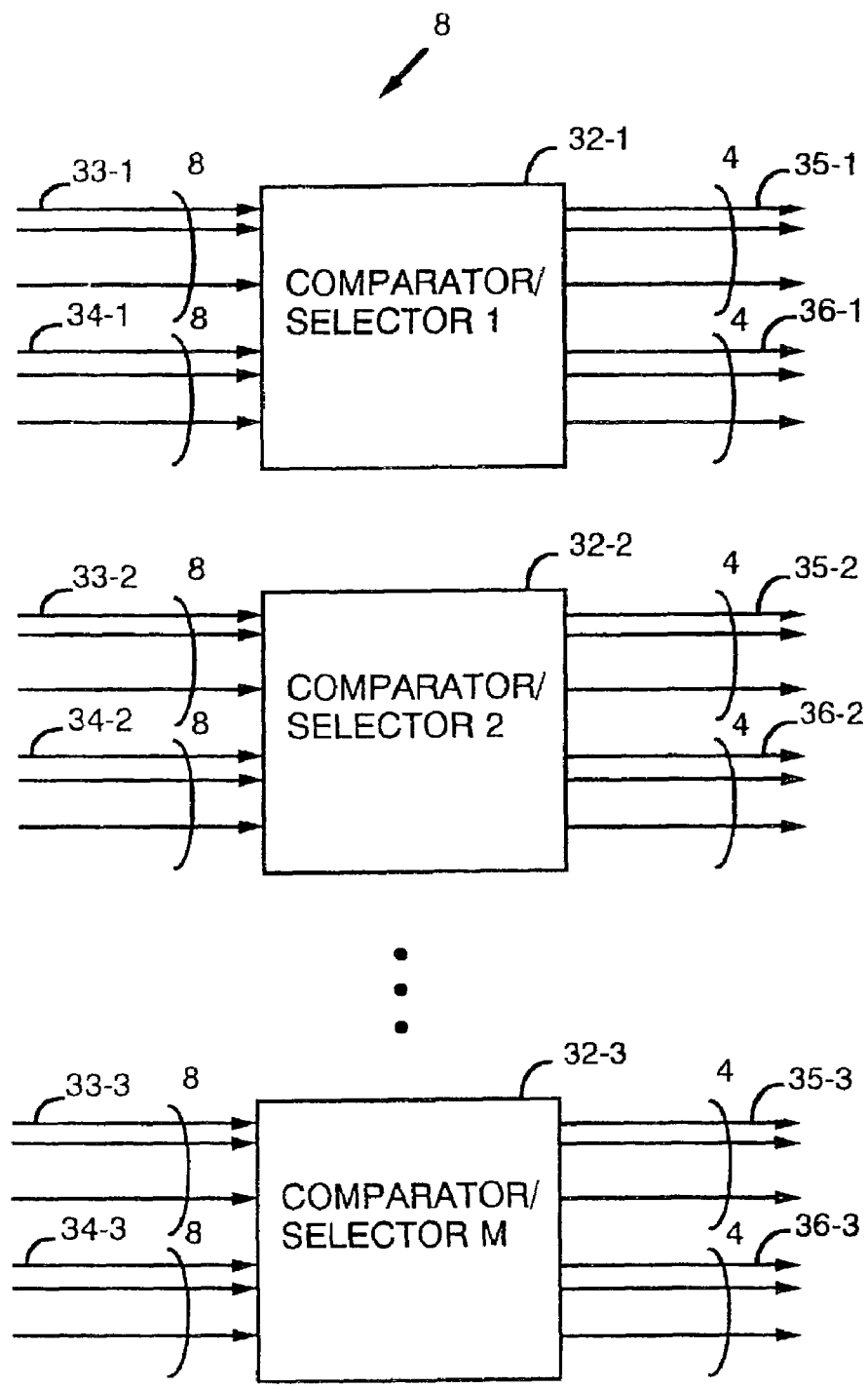
FIG. 9 is a block diagram showing a comparison/selection processor of FIG. 2 of a third embodiment of the present invention.

FIG. 9 shows a detailed construction of the comparison/selection processor 8 of FIG. 2. The comparison/selection processor 8 of FIG. 9 includes M comparator/selectors 32, survivor input terminals 33, M path-metric input terminals 34, M survivor output terminals 35 and M path-metric output terminals 36. Where, M is the number of states. In FIG. 9, the operation to select four candidates from eight candidates for each state is explained. The comparator/selector 32 receives eight candidates for survivors and eight path-metrics and outputs survivors and path-metrics corresponding to four higher order metrics.

Figure 10:
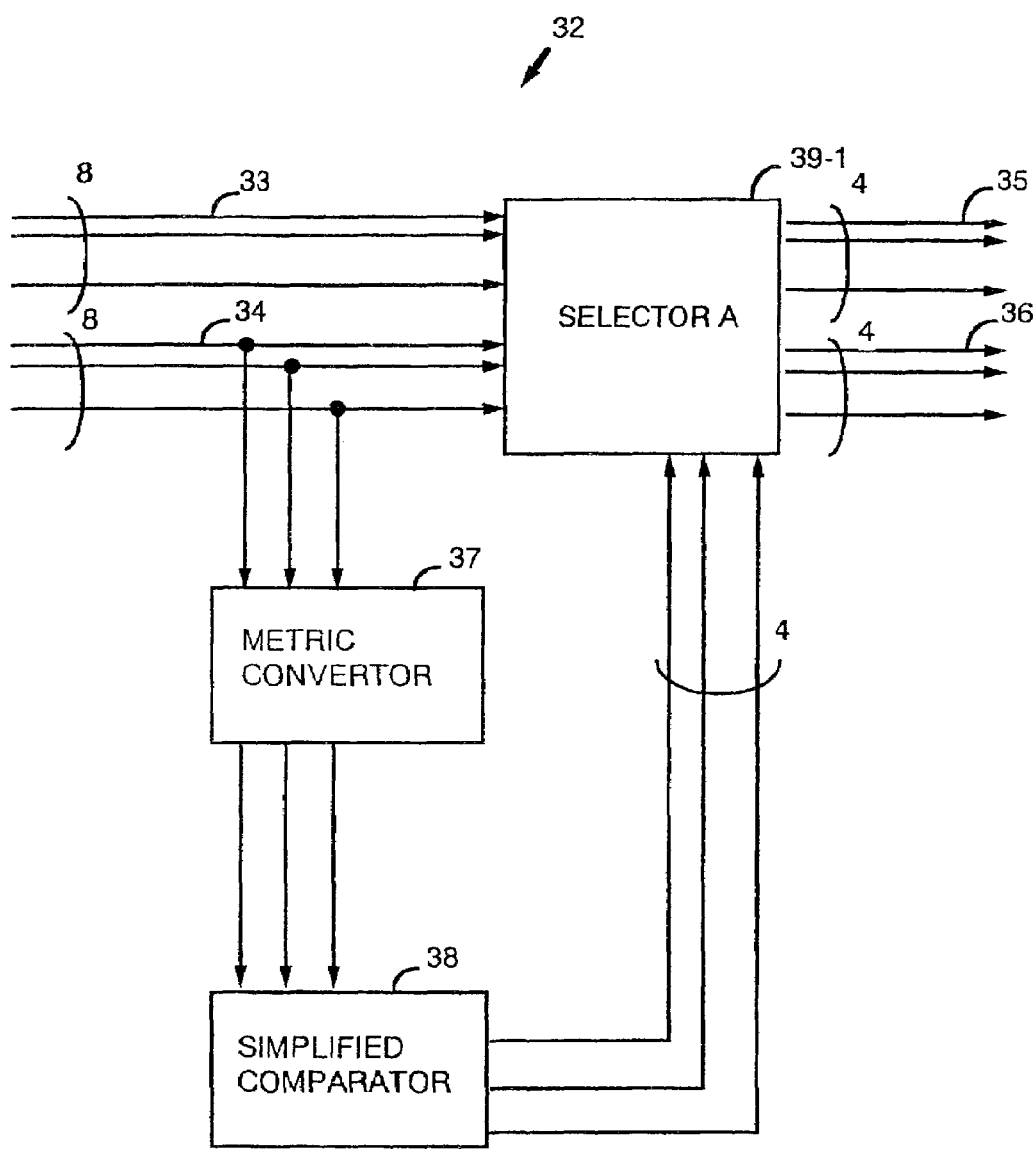
FIG. 10 is a block diagram showing a comparator/selector in the comparison/selection processor of FIG. 9.

FIG. 10 shows a detailed construction of the comparator/selector 32 of FIG. 9. The comparator/selector 32 of FIG. 10 includes survivor input terminals 33, path-metric input terminals 34, survivor output terminals 35, path-metric output terminals 36, a metric convertor 37, a simplified comparator 38 and a selector A 39-1. The metric convertor 37 receives eight path-metrics and carries out the metric conversion for each path-metric. For example, this metric conversion is explained in detail in a paper "A characteristic of a Viterbi decoder in which the number of bits of a path-metric is reduced" (by Makoto Miyake et al., Technical report (B), The Institute of Electronics, Information and Communication Engineers, vol. J71-B, 4, pp. 555–562, April 1988. Other than the above method, for example, assuming a path-metric is H, the metric conversion can be obtained by carrying out a logarithmic conversion and then converting the result into integer as shown by formula (10).

$$H \leftarrow INT [\log_2 H] \quad (10)$$

In this case, assuming the bit number of the path-metric is X, the bit number after conversion becomes $\log_2 X$ bits. The simplified comparator 38 does not sort, but forms signals having four higher order candidates out of the eight candidates. However, the signals are not always need to be in a sequence of the order of likelihood of metrics. The selector A 39-1 selects four path-metrics and four survivors according to 4 selection information.

Figure 11:
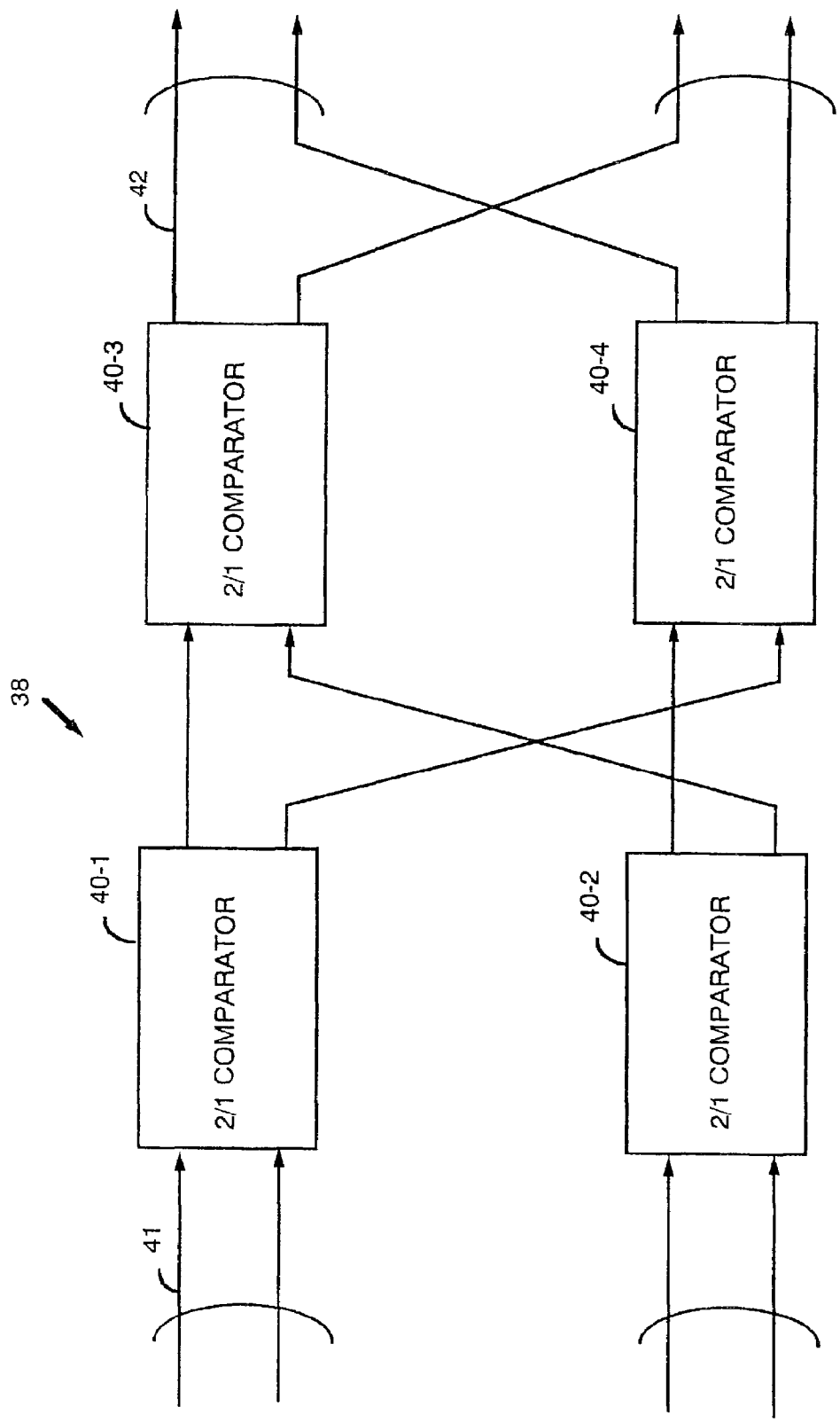
FIG. 11 is a block diagram showing a simplified comparator (4/2) in the comparator/selector of FIG. 10.

FIG. 11 shows a detailed construction of one embodiment of the simplified comparator 38 of FIG. 10. The simplified comparator 38 of FIG. 11 includes path-metric input terminals 41 after conversion, selection information output terminal 42 and four 2/1 comparators 40. Each 2/1 comparator 40 receives two path-metrics and an address (used for a selection information) which identify the path-metric, and outputs the path-metric in the order of likelihood. There is an occasion that an output of a higher order of likelihood from the second 2/1 comparators 40-2 has a lower order of likelihood than an output of a lower order of likelihood from the first 2/1 comparators 40-1.

In order to detect this, the third 2/1 comparator 40-3 and the fourth 2/1 comparator 40-4 are utilized. The lower order outputs of the first 2/1 comparator 40-1 and the lower order outputs of the second 2/1 comparator 40-2 are cross connected. In other words, a higher order of the 2/1 comparator 40-1 and a lower order of the 2/1 comparator 40-2 are input to the 2/1 comparator 40-3, and a higher order of the 2/1 comparator 40-2 and a lower order of a 2/1 comparator 40-1 are input to the 2/1 comparator 40-4. Two metrics with higher orders among the four path-metrics can be selected by selecting an output of the higher likelihood from the third 2/1 comparator 40-3 and an output of the higher likelihood from the fourth 2/1 comparator 40-4, although the order of likelihood for the selected two paths is not decided. The two lower order likelihood signal outputs from the third 2/1 comparator 40-3 and from the fourth 2/1 comparator 40-4 are illustrated in FIG. 11 and they are explained in FIG. 12.

Figure 12:
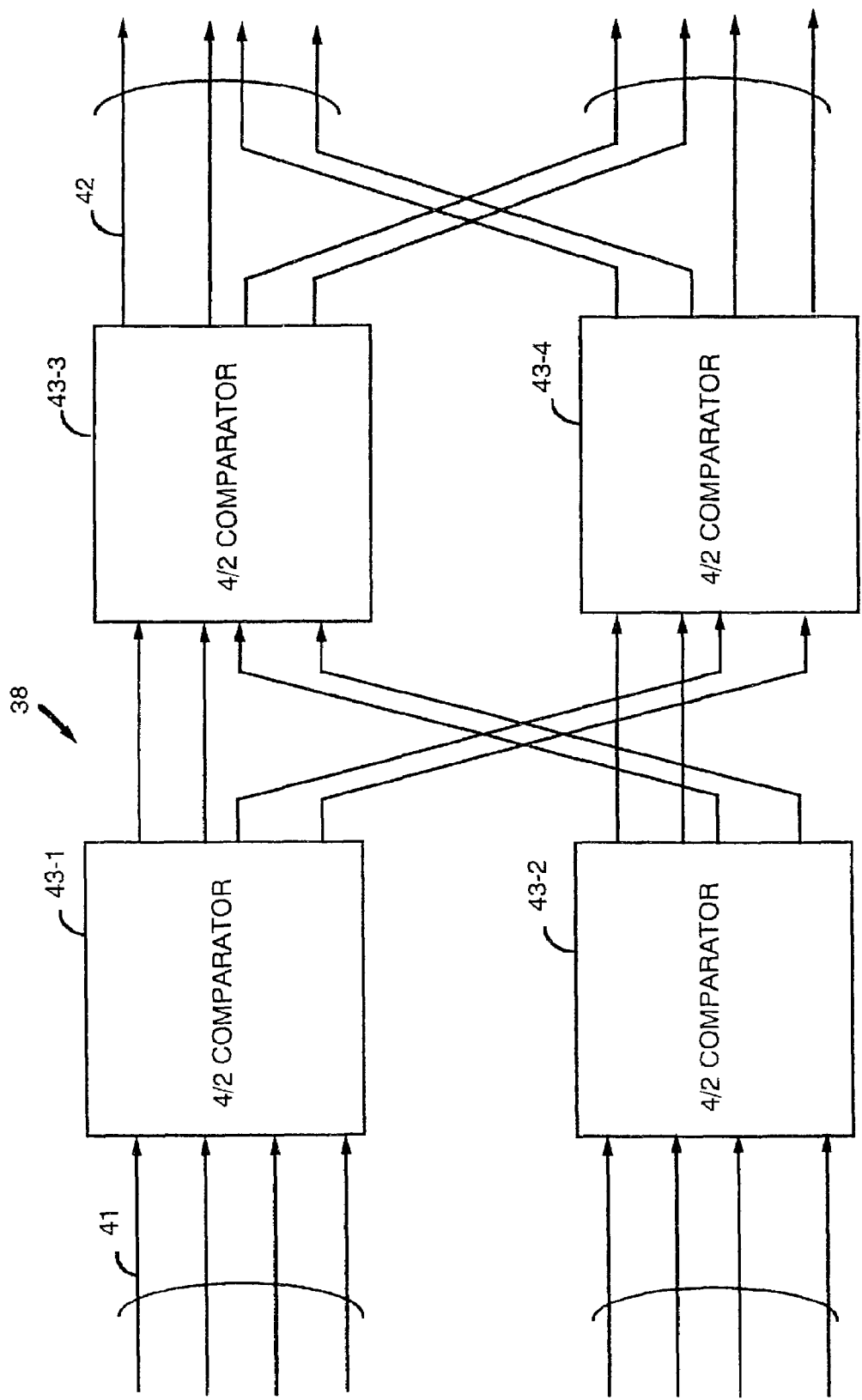
FIG. 12 is a block diagram showing a simplified comparator (8/4) in the comparator/selector of FIG. 10.

FIG. 12 shows a detailed construction of another embodiment of the simplified comparator 38 of FIG. 10. The simplified comparator 38 in FIG. 12 expands the simplified comparator 38 of FIG. 11. The simplified comparator 38 of FIG. 12 includes path-metric input terminals 41 after conversion, selection information output terminals 42 and four 4/2 comparators 43. Each 4/2 comparator is equivalent to the simplified comparator 38 of FIG. 11. In a similar manner for that of the simplified comparator 38 of FIG. 11, each 4/2 comparator 43 receives four path-metrics and an address (used for a selection information) for identifying the four path-metrics, and identifies two metrics having higher orders of likelihood and other two metrics having lower orders of likelihood and outputs them.

There is an occasion that outputs of two higher orders of likelihood from the second 4/2 comparators 43-2 have lower orders of likelihood than outputs of two lower orders of likelihood from the first 4/2 comparators 43-1. In order to detect this, the third 4/2 comparator 43-3 and the fourth 4/2 comparator 43-4 are utilized. The lower order outputs of the first 4/2 comparator 43-1 and the lower order outputs of the second 4/2 comparator 43-2 are cross connected. In other words, a higher order of the first 4/2 comparator 43-1 and a lower order of second 4/2 comparator 43-2 are input to the third 4/2 comparator 43-3, and a higher order of second 4/2 comparator 43-2 and a lower order of the first 4/2 comparator 43-1 are input to the fourth 4/2 comparator 43-4. Four metrics with higher orders among the eight path-metrics can be selected by selecting two outputs of the higher likelihood from the third 4/2 comparator 43-3 and two outputs of the higher likelihood from the fourth 4/2 comparator 43-4, although the order of likelihood for the selected four paths is not decided. In this way, assuming U is a natural number, a comparator having $2^U/2^{U-1}$ inputs can be designed.

This simplified comparison/selection processing does not only apply to Viterbi equalization but also it can easily be applied to Viterbi decoding. In the comparison/selection processing according to the present invention, a total number of 2/1 comparators is $S^2$ and a maximum stage number of 2/1 comparators is S. In other words, since circuit scale increases in proportion to $S^2$ and delay length increases in proportion to $S \log_2 S$, the total number of comparators is approximately ½, and the delay length is approximately $1/(\log_2 S+1)$ in comparison with the conventional circuit.

Figure 13:
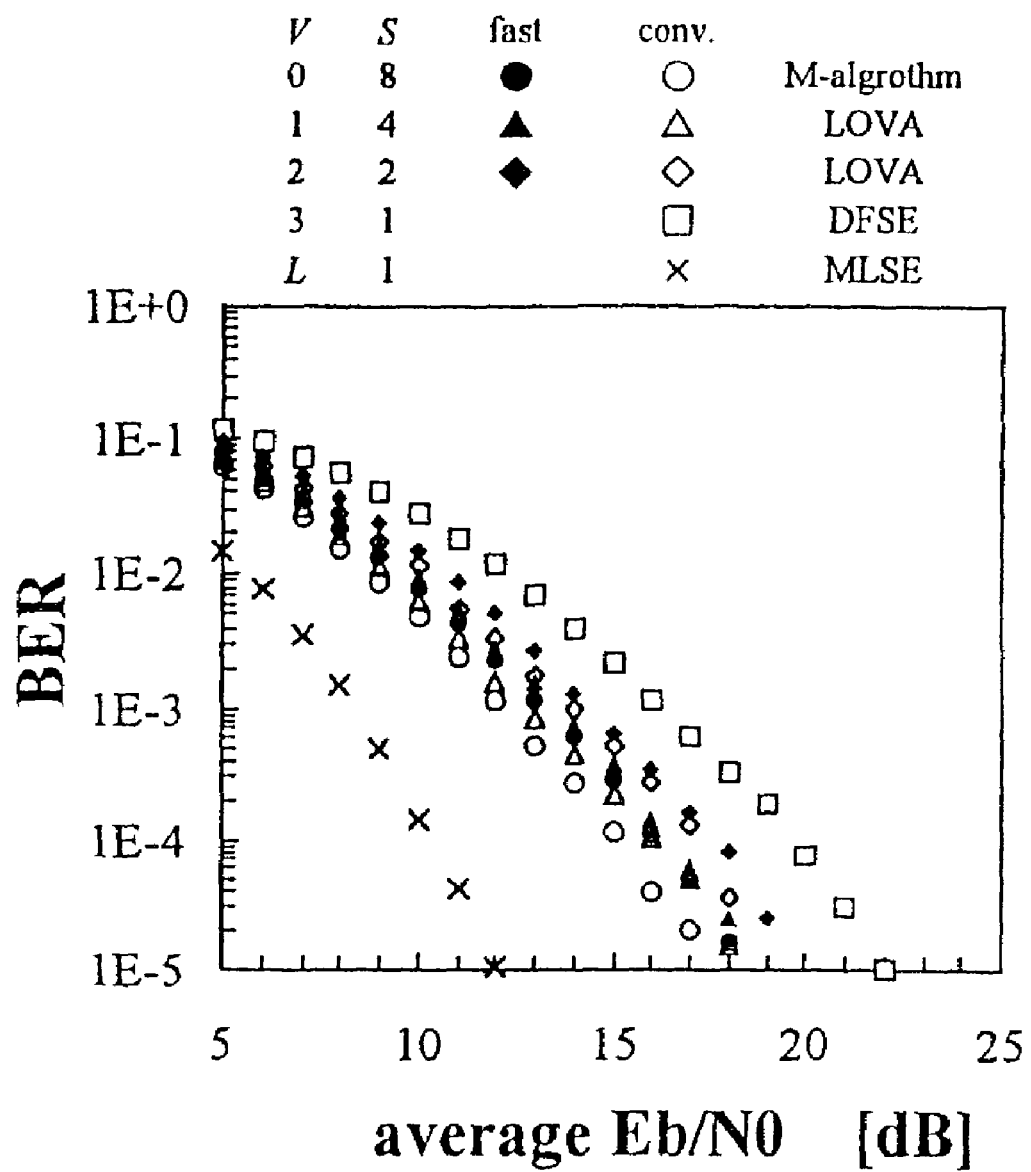
FIG. 13 shows characteristics of a bit error rate (BER) characteristic of six waves each having an equal power under the Rayleigh fading by a sequence estimation method of the second embodiment of the present invention.

FIG. 13 shows characteristics of bit error rate (BER) characteristic of six waves each having an equal power under Rayleigh fading. In FIG. 6, a relationship between the number of survivors S and a memory length of a trellis of the Viterbi algorithm is a constant value such as S $2^V$=8, except the MLSE in case of V=L. In FIG. 6, "fast" relates the present invention "conv" relates the conventional method. FIG. 6 illustrates that an expansion of S is effective and the characteristic deterioration by the present invention is small.

Embodiment 4.

Figure 14:
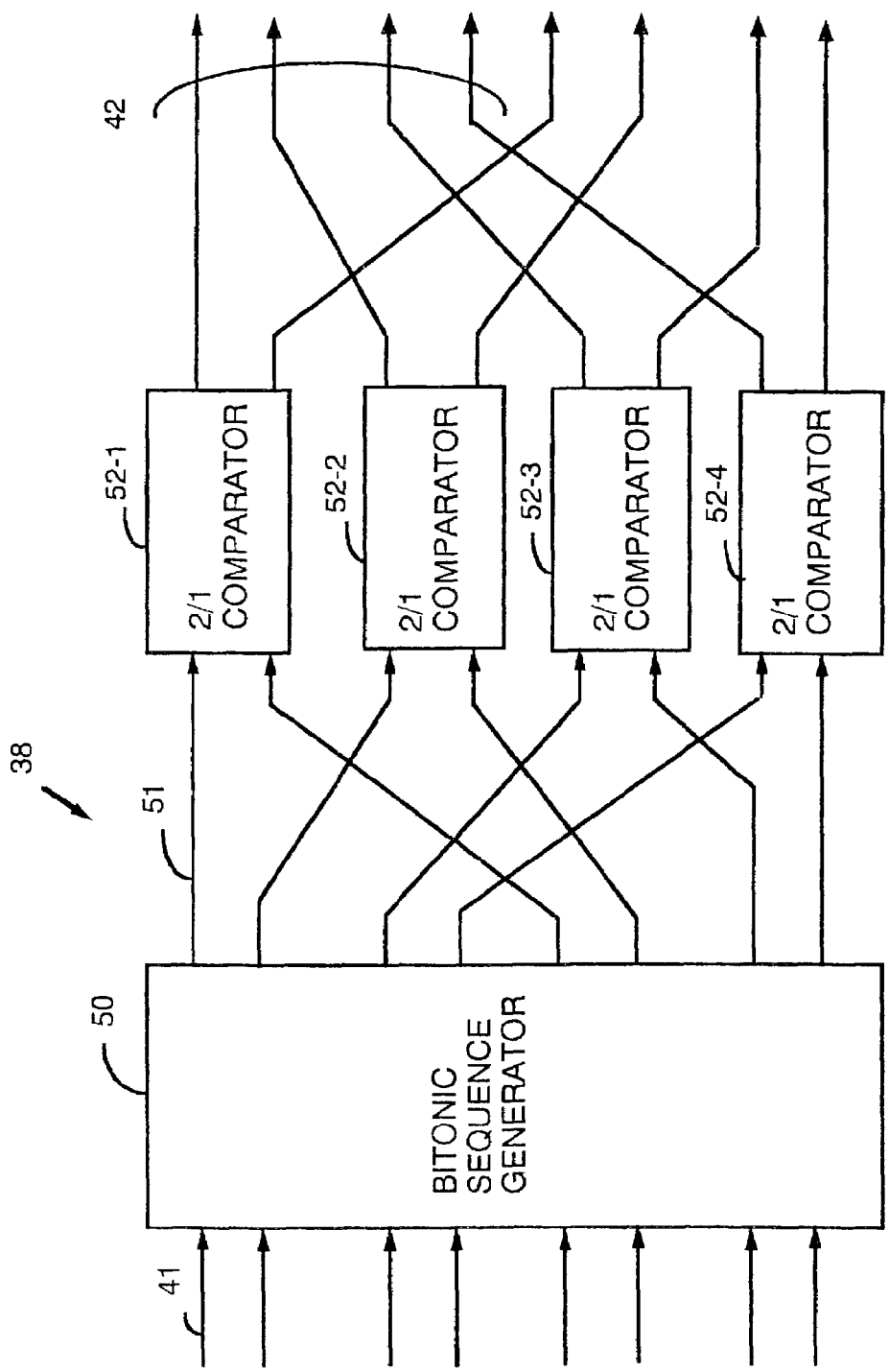
FIG. 14 is a block diagram showing a simplified comparator of the fourth embodiment of the present invention.

FIG. 14 shows a simplified comparator of a fourth embodiment of the present invention. The simplified comparator of FIG. 14 corresponds to the simplified comparator 38 of FIG. 10. The simplified comparator of FIG. 14 comprises path-metric input terminals 41 after conversion of the metric, selection information output terminals 42, a bitonic sequence generator 50, outputs 51 of the bitonic sequence generator 50, and four 2/1 comparators 52. The bitonic sequence generator 50 receives eight path-metrics inputted from the path-metric input terminals 41 and addresses (used as selection information) for identifying these path-metrics. The bitonic sequence generator 50 then outputs an eight-element bitonic sequence $\{b_1, b_2, \ldots b_8\}$ which consists of eight path-metrics and the address sequence $\{a_1, a_2, \ldots, a_8\}$ for identifying the eight path-metrics composing the bitonic sequence. The 2/1 comparator 52 has the same function as that of the 2/1 comparator 40 of FIG. 11.

The bitonic sequence generator 50 arranges the eight path-metrics inputted from the path-metric input terminals 41 to generate a bitonic sequence $\{b_1, b_2, \ldots, b_8\}$ which or whose cyclic shift satisfies the formula (11).

$$b_1 \leq b_2 \leq \ldots \leq b_j \geq b_{j+1} \geq \ldots \geq b_8 \ (1 \leq j \leq 8) \tag{11}$$

At the same time, the bitonic sequence generator 50 generates the address sequence $\{a_1, a_2, \ldots, a_8\}$ corresponding to this bitonic sequence. The bitonic sequence generator 50 then outputs in parallel eight pairs $(b_1, a_1)$, $(b_2, a_2)$, . . . , $(b_8, a_8)$, each of which is a combination of each element of the bitonic sequence and an element of the address sequence corresponding to the element of the bitonic sequence. These eight outputs 51 of the bitonic sequence generator 50 are respectively inputted into the 2/1 comparator 52 of the next stage. Due to the characteristic of the bitonic sequence, the four high likelihood selection information can be obtained by one stage comparison using four 2/1 comparators. The characteristic of the bitonic sequence is explained in detail in "Sorting networks and their applications" (Proc. AFIPS, 1968, Spring Joint Comput. Conf., vol. 32, pp. 307–314, April–May 1968).

Figure 15:
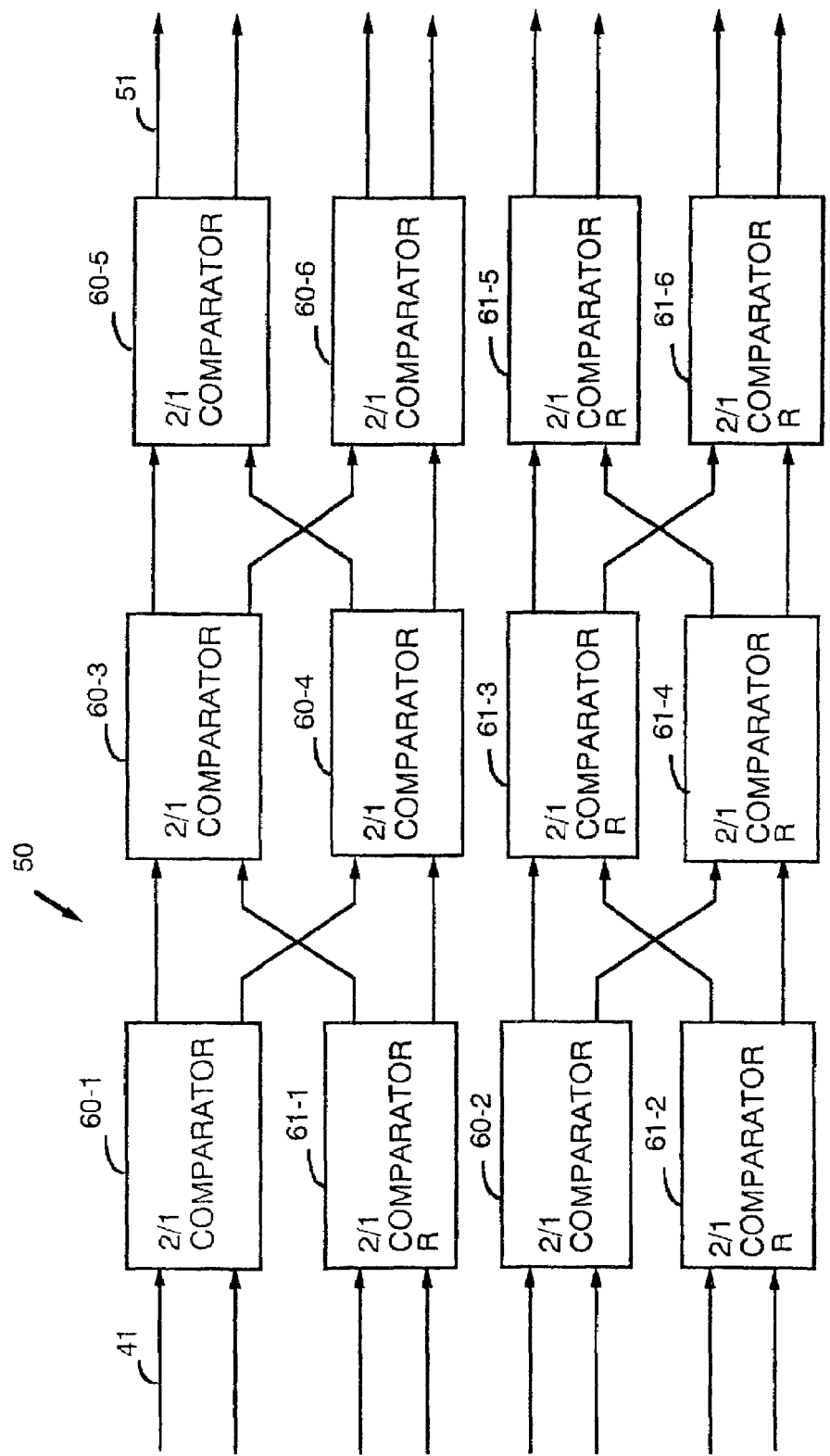
FIG. 15 is a block diagram showing a bitonic sequence generator in the simplified comparator of FIG. 14.
Figure 16:
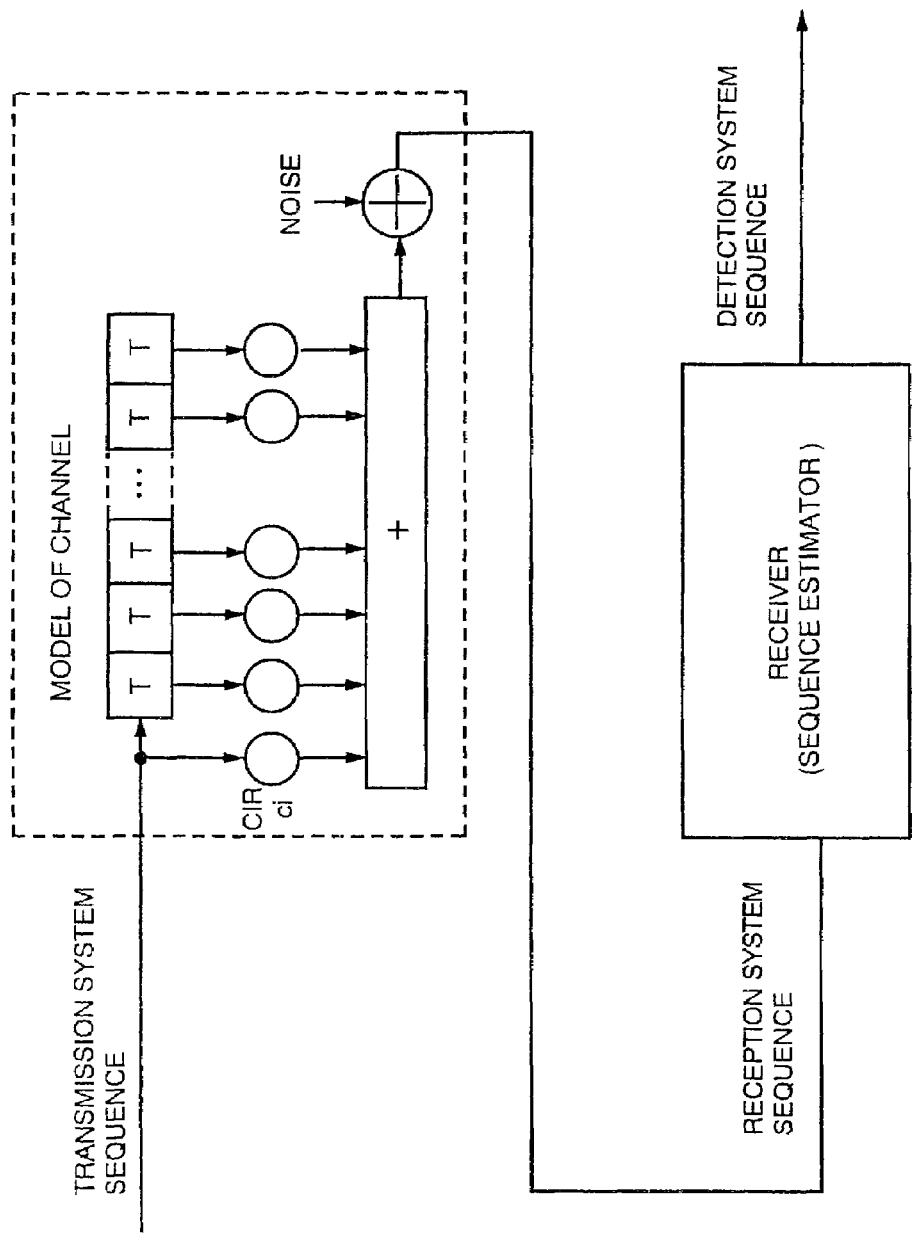
FIG. 16 is a general diagram to explain a model showing a conversion of a signal on the channel.
Figure 17:
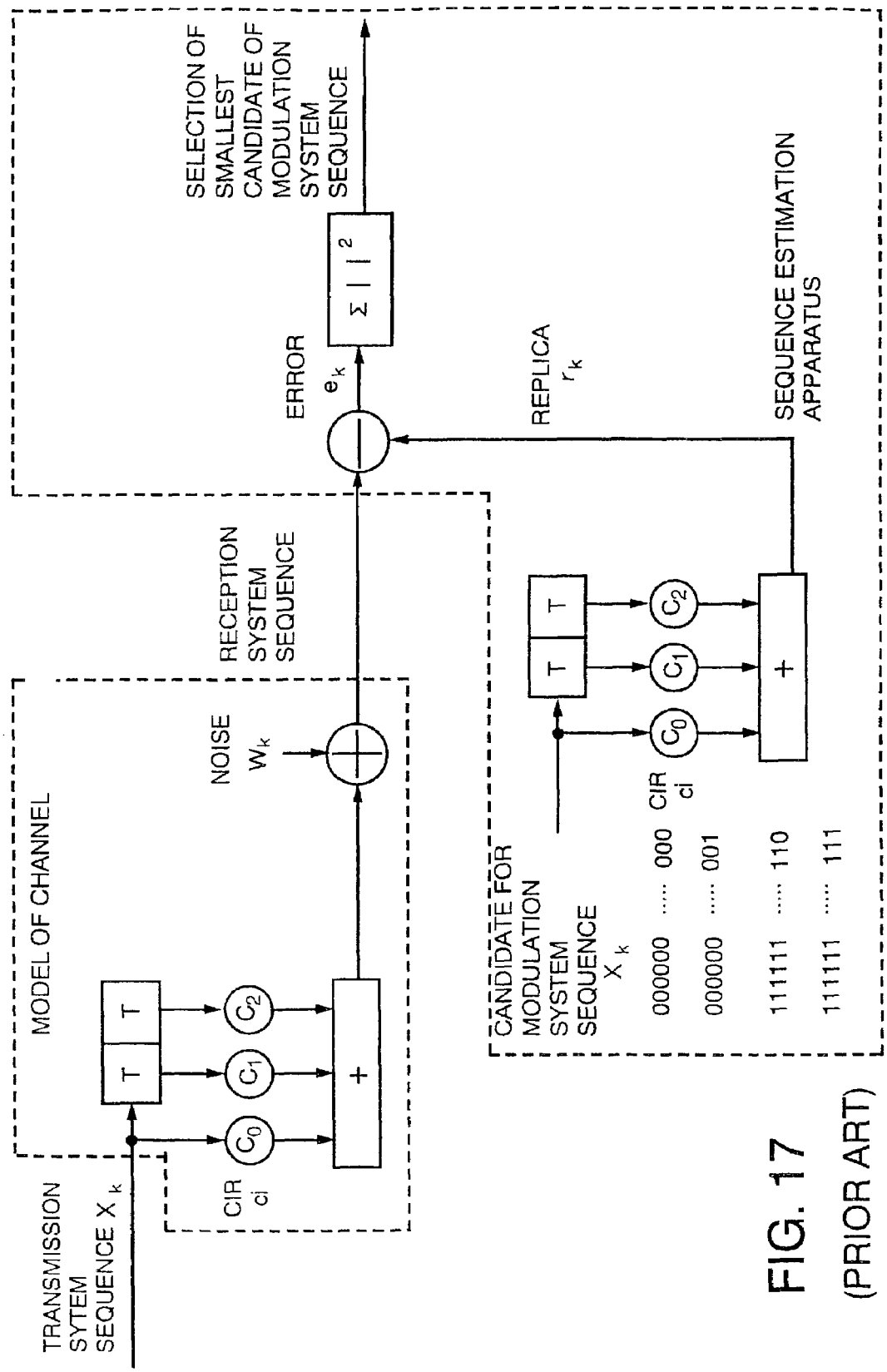
FIG. 17 is a general diagram to explain a model of a sequence estimator which is most suitable for a case that a memory length L of a channel is two.
Figure 18:
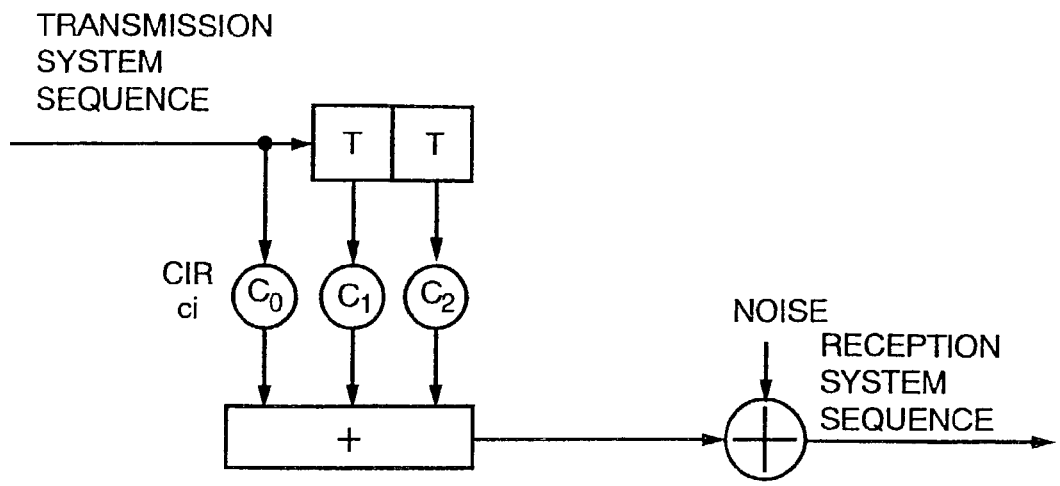
FIG. 18 is a general diagram to explain a model of the channel for calculating an error power at a current time k, according to transmitted data during two preceding time (k−2) and the current time k.
Figure 19:
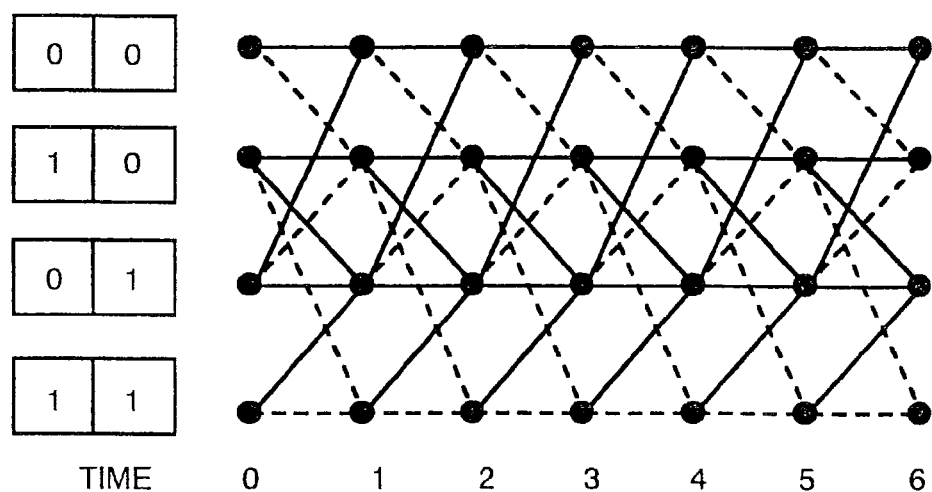
FIG. 19 is a trellis diagram showing a data transition information according to a combination of across the two times.
Figure 20:
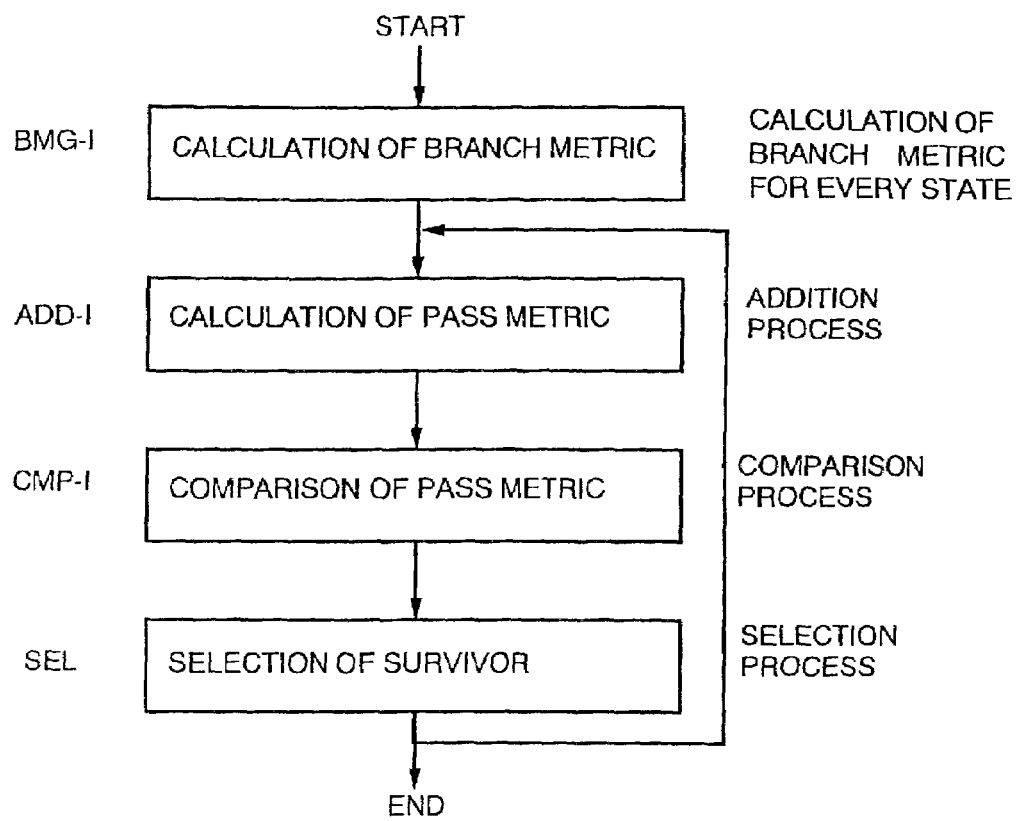
FIG. 20 is a flowchart showing a processing sequence at each time of a Viterbi algorithm.
Figure 21:
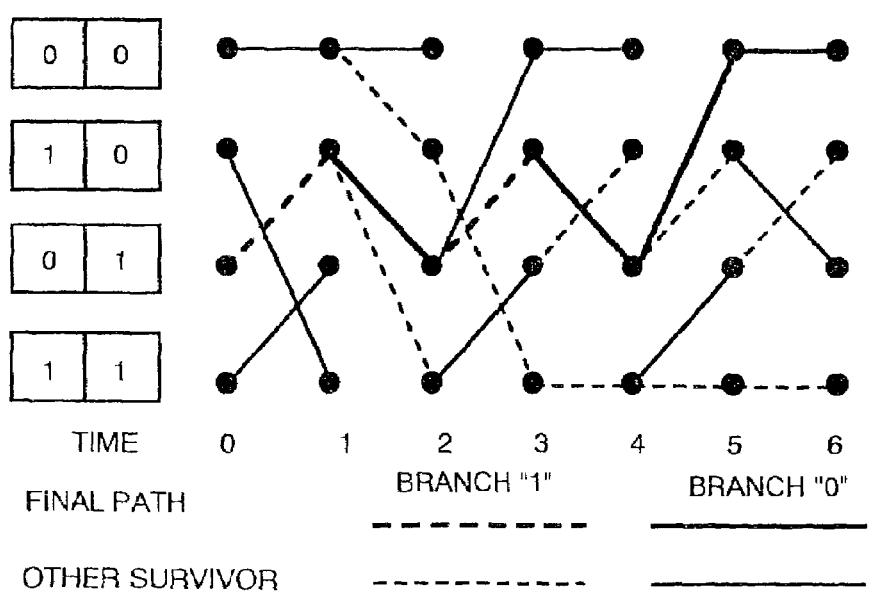
FIG. 21 is a general diagram showing the result for carrying out the Viterbi algorithm using the trellis diagram of FIG. 19.
Figure 22:
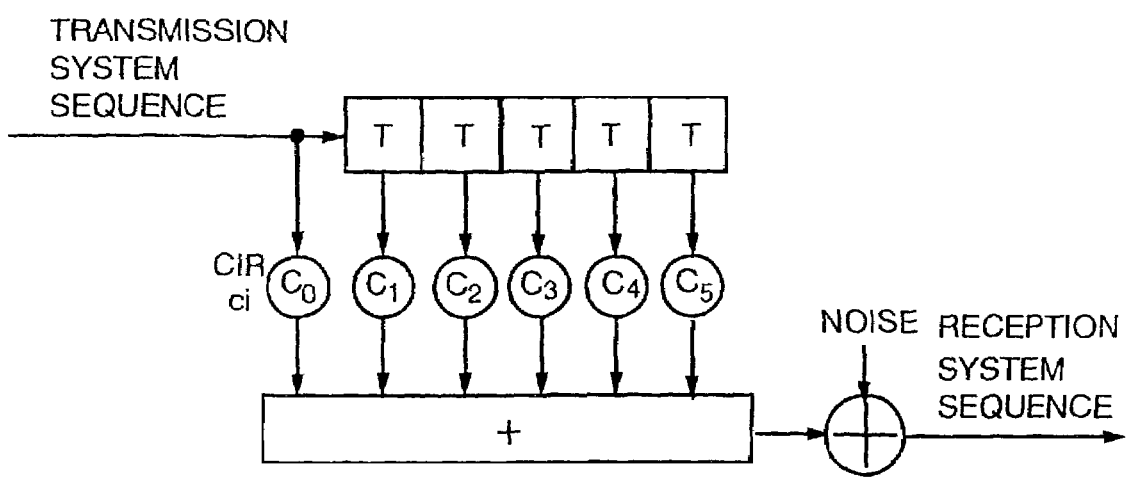
FIG. 22 is a general diagram showing a model of the channel when the memory length L of the channel is five.
Figure 23:
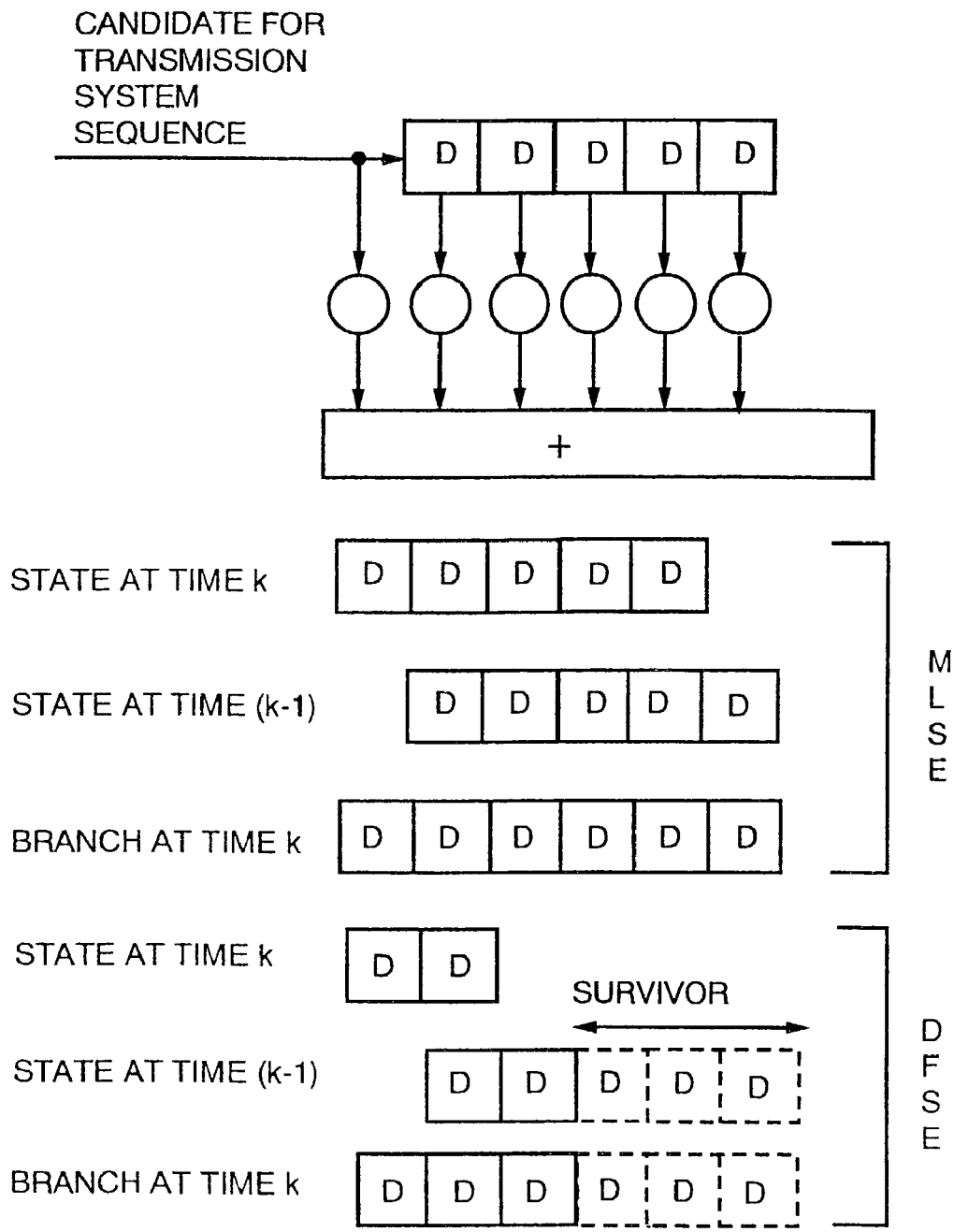
FIG. 23 is a general diagram to explain a difference between the operation of DFSE and that of MLSE.
Figure 24:
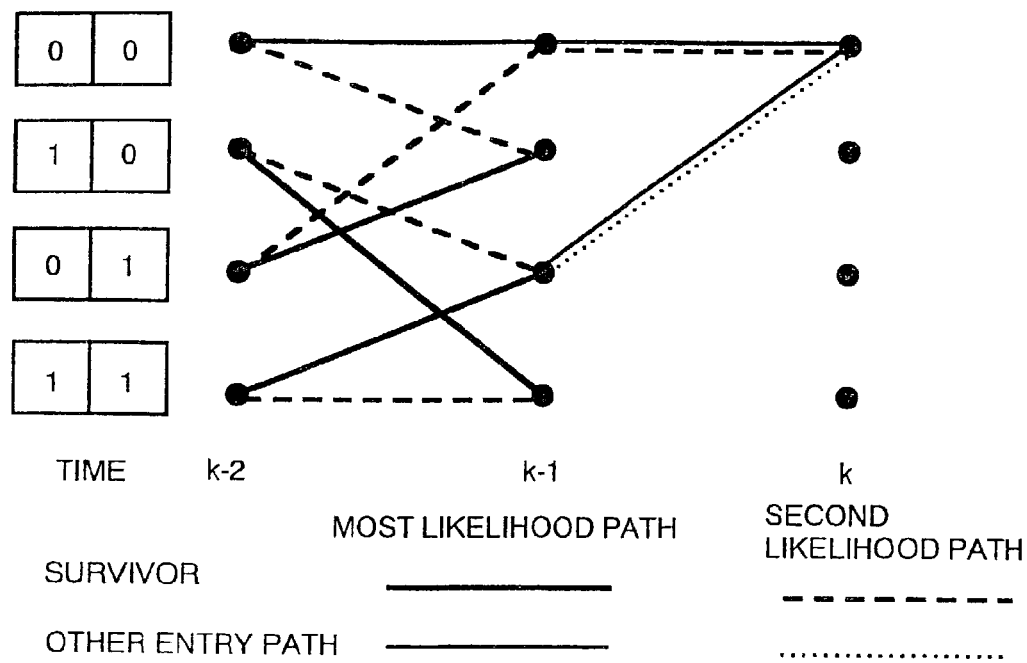
FIG. 24 is a general diagram to explain the operation of a list output Viterbi algorithm when a state number is four and the number of survivors is two.
Figure 25:
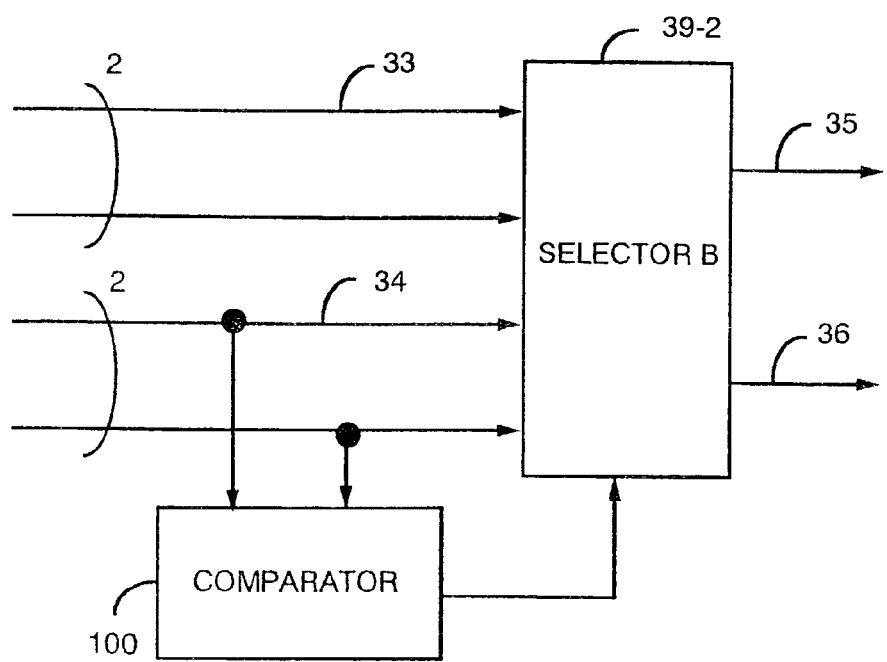
FIG. 25 is a block diagram showing a comparison/selection processing for realizing an ordinary Viterbi algorithm.
Figure 26:
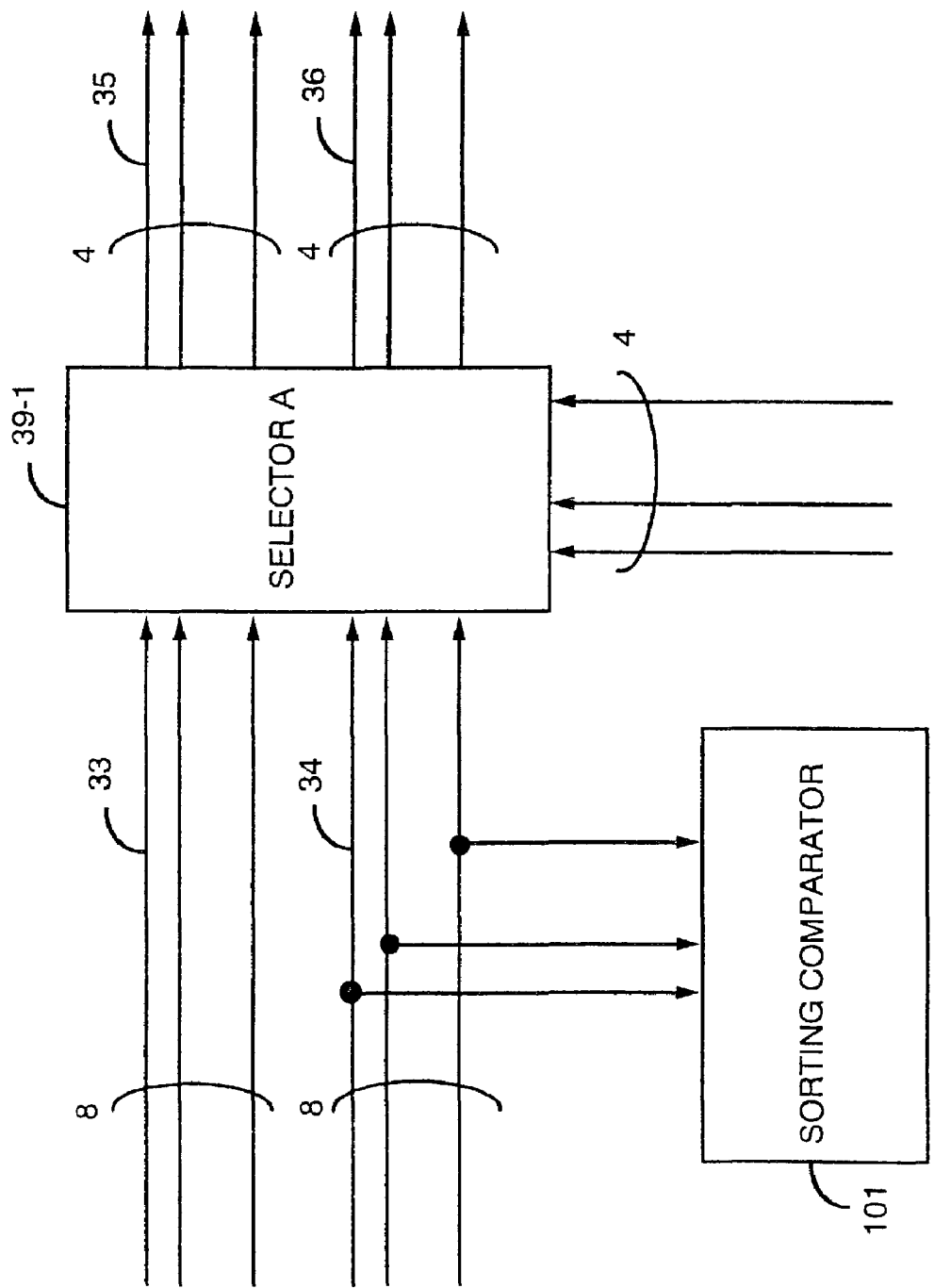
FIG. 26 is a block diagram showing a comparison/selection processing in the list output Viterbi algorithm.
Figure 27:
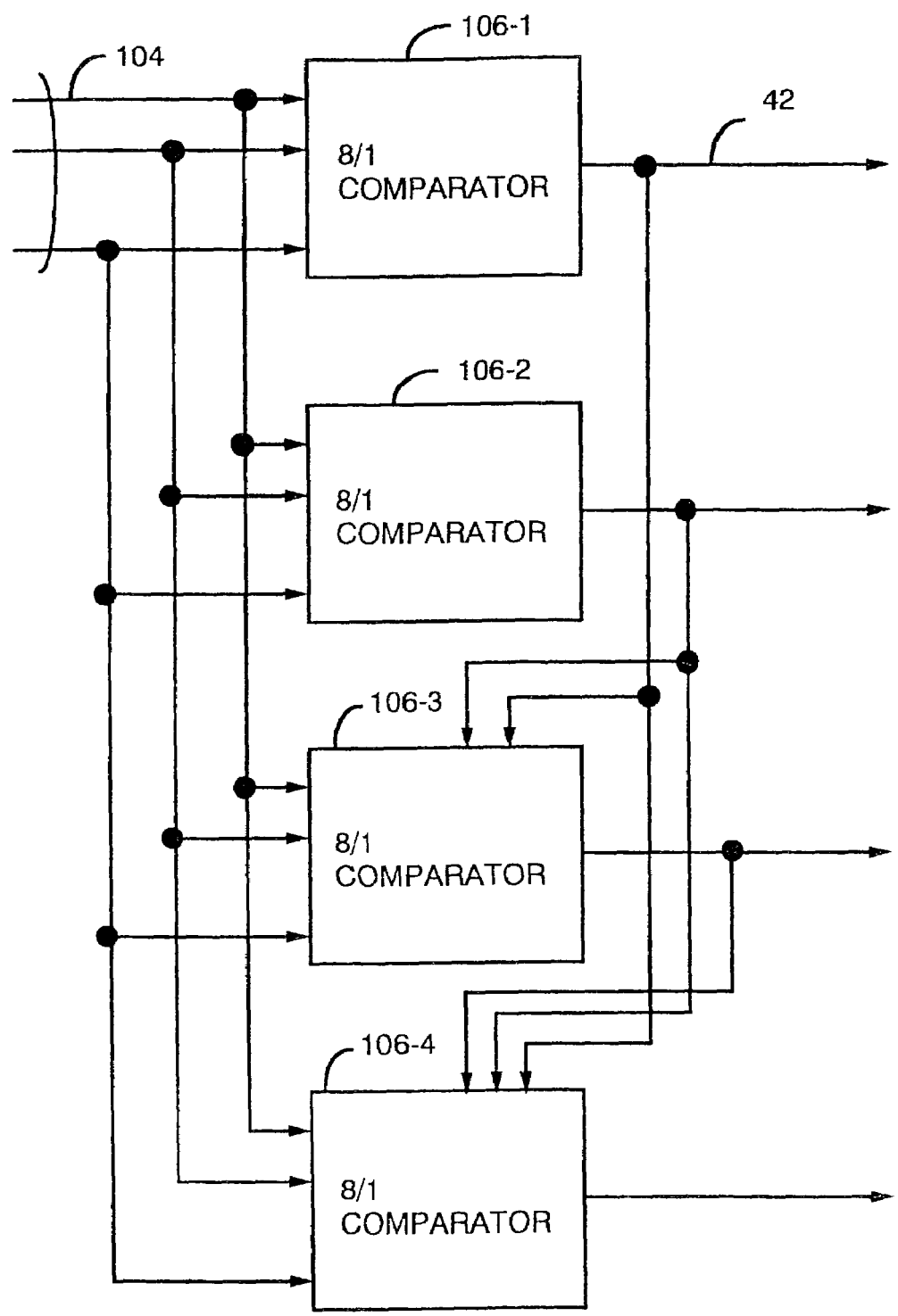
FIG. 27 is a block diagram showing a sorting comparator in the comparison/selection processing of FIG. 26.
Figure 28:
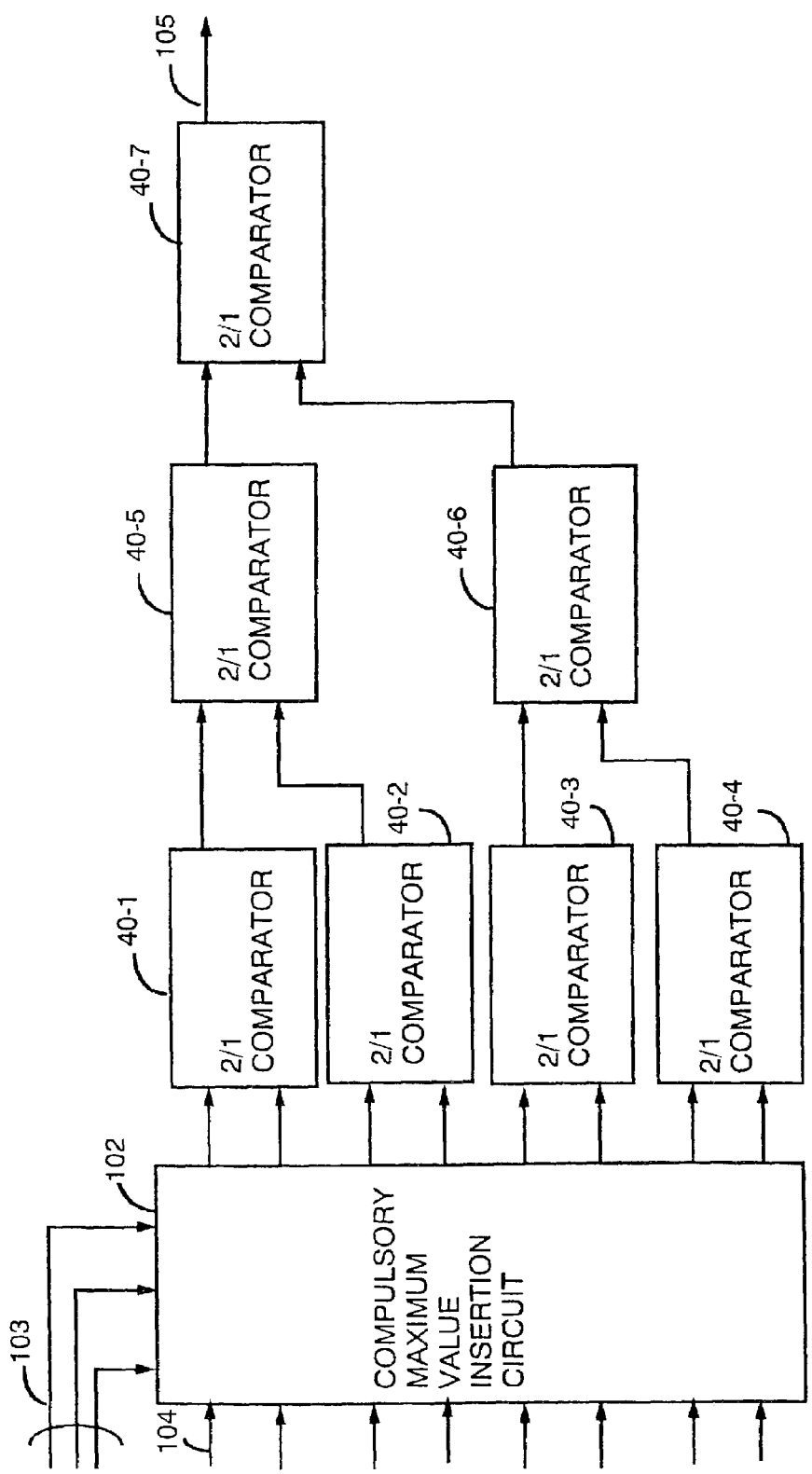
FIG. 28 is a block diagram showing an 8/1 comparator in the sorting comparator of FIG. 27.
Figure 29:
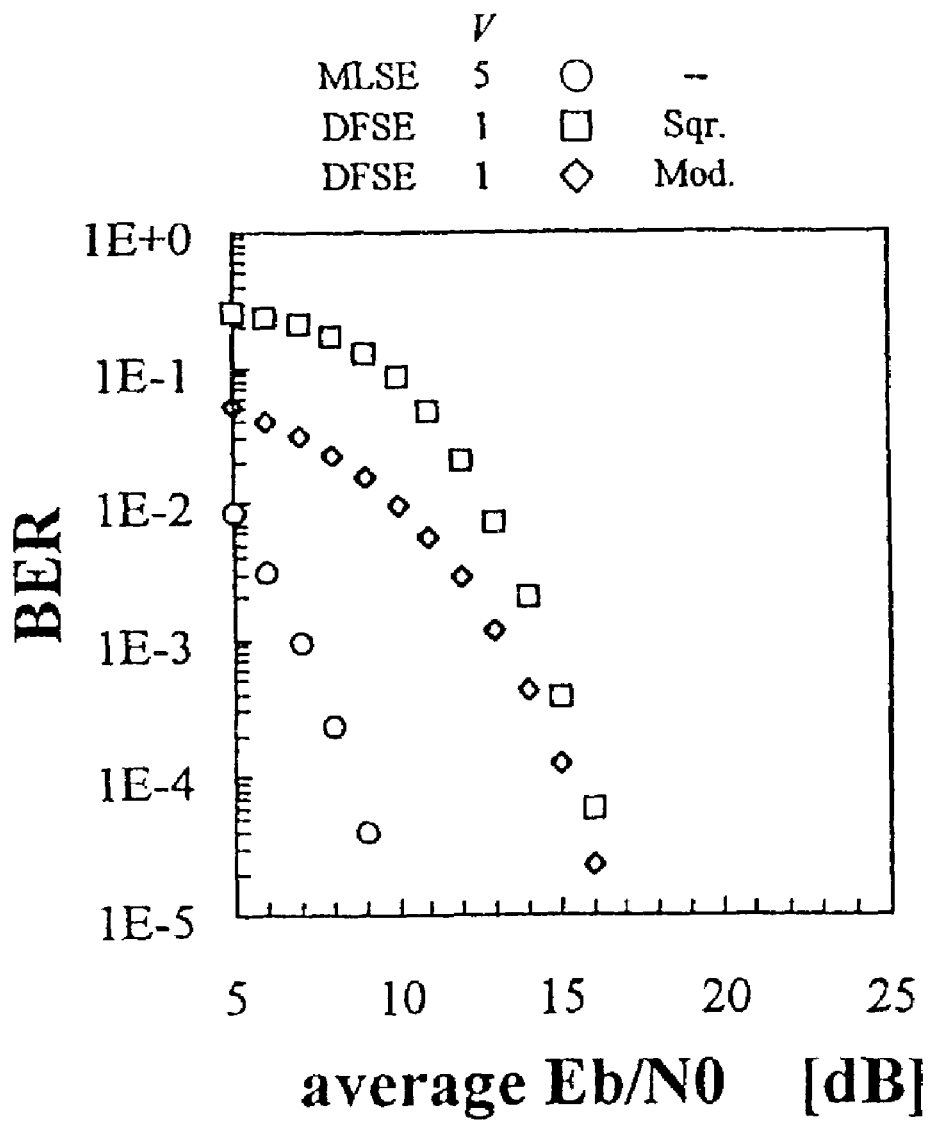
FIG. 29 shows BER characteristics when the tap coefficients is 1,2,0,0,0,4 and the memory length L of the channel is five.
Figure 30:
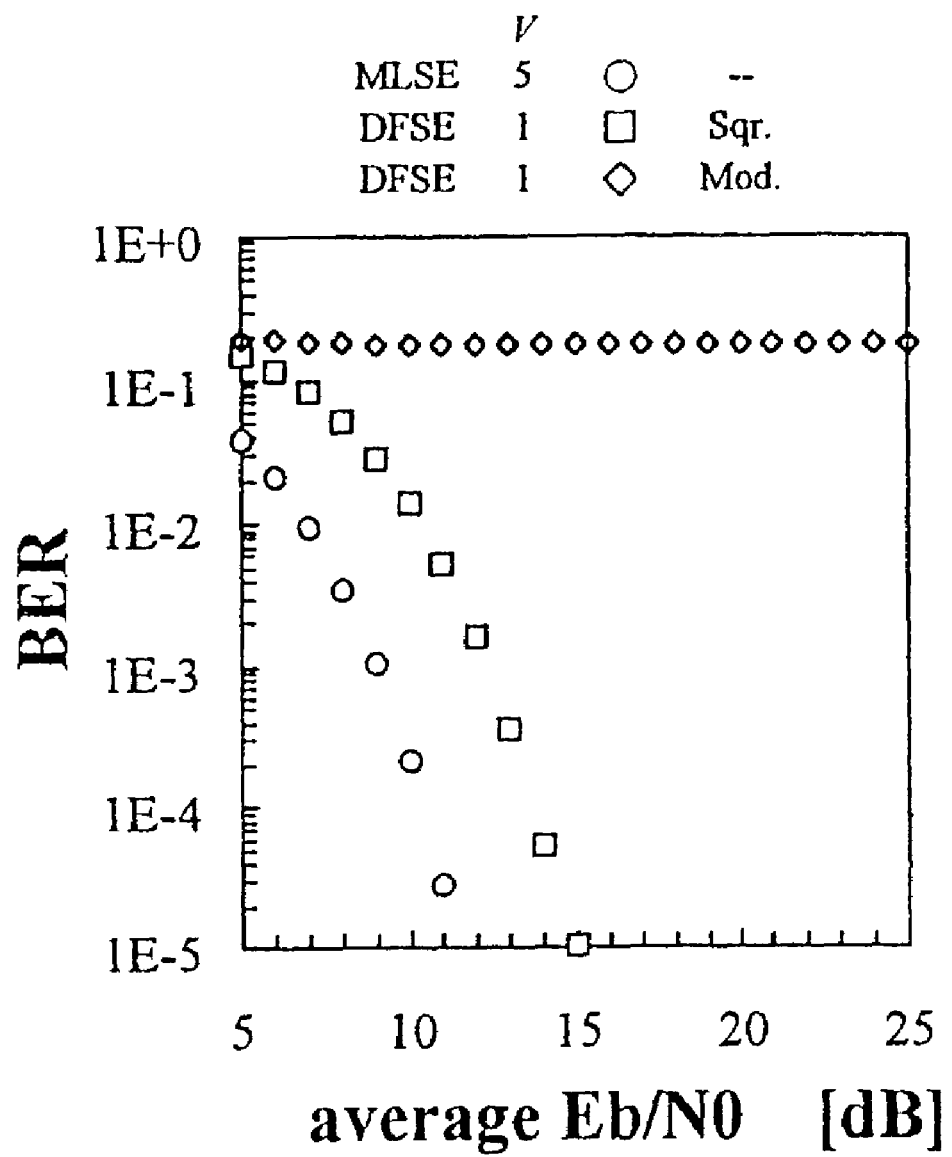
FIG. 30 shows BER characteristics when the tap coefficients of 1,0,1,0,1,0 and the memory length L of the channel is five.

FIG. 15 shows one example of the internal construction of the bitonic sequence generator 50. The bitonic sequence generator 50 of FIG. 15 includes six 2/1 comparators 60 (60-1~60-6) and six 2/1 comparators R 61 (61-1~61-6). The six 2/1 comparators 60 have the same function as those of the 2/1 comparator 52 of FIG. 14. The 2/1 comparators R 61 have the same function as those of the 2/1 comparators 60, except that the order of the output is reversed. The eight path-metrics inputted from the path-metric input terminals 41 are rearranged into two bitonic sequences each having four elements by the 2/1 comparators 60-1 and 60-2, and the 2/1 comparators R 61-1 and R 61-2 in the first stage. One of the bitonic sequences having four elements comprises the output from the 2/1 comparators 60-1 and the output from the 2/1 comparators R 61-1. The other bitonic sequence having four elements comprises the output from the 2/1 comparators 60-2 and the output from the 2/1 comparators R 61-2. The two bitonic sequences having four elements are sorted respectively in the ascending order and in the descending order and are merged into a bitonic sequence having eight elements by the 2/1 comparators and the 2/1 comparators R in the second and the third stages. Generally, when U is a natural number, larger bitonic sequences can be generated by repeating the sort and the merge. Finally, the bitonic sequences having $2^U$ elements can be made.

The simplified comparator for selecting four elements from eight elements is explained above. Similarly, when U is a natural number, the simplified comparator for selecting $2^{U-1}$ elements from $2^U$ elements can be easily constructed. When q is a natural number, even if the modulation system having the modulation index is $Q=2^q$ is used, the simplified comparator for selecting $2^{U-1}$ elements from $2^{U-1+q}$ elements can be easily constructed.

This processing of the simplified comparator applied not only to the Viterbi equalization, but also easily to the Viterbi decoding. In the compare-select operation from 2S to S according to the present invention, the sum of the 2/1 comparator increases due to increase of S as follows.

$$S \frac{(\log_2 S)^2 + \log_2 S + 2}{2} \tag{12}$$

The maximum number of steps of the 2/1 comparators is obtained as follows.

$$\frac{(\log_2 S)^2 + \log_2 S + 2}{2} \tag{13}$$

In the other word, the scale of the circuit is in proportion to $S(\log_2 S)^2$ and the delay increases in proportion to $(\log_2 S)^2$. Therefore, compared with the third embodiment, the invention of the fourth embodiment is more advantageous when S increases. The characteristic of the bit error rate characteristic is the same as the characteristic of the third embodiment shown as "fast" in FIG. 13.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sequence estimation method comprising:
    estimating a transmitted signal sequence transmitted from a transmission side based on a characteristic of a received signal and a channel using a Viterbi algorithm, wherein the Viterbi algorithm is a list output Viterbi algorithm that decides one or a plurality of survivors for each state of the Viterbi algorithm including one or more states; and
    a plurality of metric calculation steps performed on the received signal and the channel for each branch.

2. The sequence estimation method of claim 1, further comprising:
    determining a branch metric based on the received signal, a channel characteristic, and a branch selection signal; and
    generating a branch metric output signal.

3. A sequence estimation method comprising:
    estimating a transmitted signal sequence transmitted from a transmission side based on a characteristic of a received signal and a channel using a Viterbi algorithm, wherein the Viterbi algorithm is a list output Viterbi algorithm that decides one or a plurality of survivors for each state of the Viterbi algorithm including one or more states;
    a plurality of metric calculation steps performed on the received signal and the channel for each branch; and
    a metric selection step for selecting a metric calculated by the plurality of metric calculation steps.

4. A sequence estimation method comprising:
    estimating a transmitted signal sequence transmitted from a transmission side based on a characteristic of a received signal and a channel using a Viterbi algorithm, wherein the Viterbi algorithm is a list output Viterbi algorithm that decides one or a plurality of survivors for each state of the Viterbi algorithm including one or more states;
    a plurality of metric calculation steps performed on the received signal and the channel for each branch; and
    a metric combination step for weighted-summing metrics calculated by the plurality of metric calculation steps.

5. A sequence estimation apparatus comprising:
    a Viterbi algorithm, wherein the Viterbi algorithm is a list output Viterbi algorithm that estimates a transmitted signal sequence transmitted from a transmission side based on a characteristic of a received signal and a channel to decide one or a plurality of survivors for each state of the Viterbi algorithm including one or more states; and a plurality of metric calculators for calculating a plurality of metrics on the received signal and channel for each branch.

6. A sequence estimation apparatus comprising:

a Viterbi algorithm, wherein the Viterbi algorithm is a list output Viterbi algorithm that estimates a transmitted signal sequence transmitted from a transmission side based on a characteristic of a received signal and a channel to decide one or a plurality of survivors for each state of the Viterbi algorithm including one or more states;

a plurality of metric calculators for calculating a plurality of metrics on the received signal and channel for each branch; and a metric selector for selecting one of metrics calculated by the plurality of metric calculators.

7. A sequence estimation apparatus comprising:

a Viterbi algorithm, wherein the Viterbi algorithm is a list output Viterbi algorithm that estimates a transmitted signal sequence transmitted from a transmission side based on a characteristic of a received signal and a channel to decide one or a plurality of survivors for each state of the Viterbi algorithm including one or more states;

a plurality of metric calculators for calculating a plurality of metrics on the received signal and channel for each branch; and a metric combinor for weighted-summing metrics calculated by the plurality of metric calculators.

* * * * *